US005166283A

United States Patent [19]

Nishikawa et al.

[11] Patent Number: 5,166,283

[45] Date of Patent: Nov. 24, 1992

[54] POLYMER HAVING DIHYDROPYRIDINE RINGS OR DIHYDROTRIAZINE RINGS, PROCESS FOR PRODUCING THE SAME, AND APPLICATIONS THEREOF

[75] Inventors: Akio Nishikawa; Tohru Koyama, both of Hitachi; Hideki Asano, Mito; Toshikazu Narahara, Ibaraki, all of Japan

[73] Assignee: Hitachi Ltd., Tokyo, Japan

[21] Appl. No.: 715,324

[22] Filed: Jun. 14, 1991

Related U.S. Application Data

[63] Continuation of Ser. No. 181,554, Apr. 14, 1988, abandoned.

[30] Foreign Application Priority Data

Apr. 15, 1987 [JP] Japan .................................. 62-90755
Sep. 2, 1987 [JP] Japan .................................. 62-217851

[51] Int. Cl.$^5$ ....................... C08F 30/04; C08F 26/06; C08F 38/00

[52] U.S. Cl. .................................... 526/241; 526/248; 526/258; 526/280; 526/285

[58] Field of Search ............... 526/241, 248, 258, 280, 526/285

[56] References Cited

U.S. PATENT DOCUMENTS

| | | | |
|---|---|---|---|
| 3,300,456 | 1/1967 | Hay | 526/285 |
| 3,845,018 | 10/1974 | Bilow et al. | 528/220 |
| 3,879,349 | 4/1975 | Bilow et al. | 528/188 |
| 3,932,646 | 1/1976 | Meyer et al. | 514/356 |
| 4,178,430 | 12/1979 | Bilow | 528/269 |
| 4,283,557 | 8/1981 | Walton | 526/285 |
| 4,336,362 | 6/1982 | Walton | 526/248 |
| 4,730,032 | 3/1988 | Rossi et al. | 526/285 |
| 4,833,150 | 5/1989 | Minaskanian et al. | 546/167 |

FOREIGN PATENT DOCUMENTS

| | | | |
|---|---|---|---|
| 63-256623 | 10/1988 | Japan | 526/258 |

OTHER PUBLICATIONS

1046 TMOG-2 Official Gazette 4, Sep. 1984.
"Polycyclotrimerization as a general route to polymers with rings in the chain" Pure & Appl. Chem. vol. 39 No. 1,2 (1974).
"Semiconductor devices potted with resins from ethynyl-terminated Schiff bases" Nishikawa CA 110(8):59075w.

*Primary Examiner*—Bernard Lipman
*Assistant Examiner*—N. Sarofim
*Attorney, Agent, or Firm*—Fay, Sharpe, Beall, Fagan, Minnich & McKee

[57] ABSTRACT

A polymer having dihydropyridine rings or dihydrotriazine rings as main constitutional units, an ethynyl- or cyanato-terminated Schiff's compound which is a starting material for producing the polymer, and applications of the polymer.

12 Claims, 4 Drawing Sheets

POLYMER HAVING DIHYDROPYRIDINE RINGS OR DIHYDROTRIAZINE RINGS, PROCESS FOR PRODUCING THE SAME, AND APPLICATIONS THEREOF

This is a continuation of co-pending application Ser. No. 181,554 filed on Apr. 14, 1988, now abandoned.

FIELD OF THE INVENTION AND RELATED ART

1. Field of the Invention

The present invention relates to a Shiff's compound which has one or two terminal ethynyl or cyanato groups in the molecule and on heating, forms a polymer excellent in heat resistance. The invention also relates to a polymer having dihydropyridine rings or dihydrotriazine rings which is produced from said Shiff's compound and further to a process for producing said polymer and to applications of the polymer.

2. Prior Art

In the field of electronic components and the field of electrical machines and devices, there are movements to higher densities, higher reliability, and moreover smaller sizes, lighter weights, and higher performance. In order to achieve this, there are growing needs for organic materials which are convertible into hardened products having outstanding heat resistance and small coefficients of thermal expansion and are distinguished in moldability and processability (curable at low temperatures and exhibiting high flow). Heretofore, materials based on N-substituted maleimides have been investigated to meet these needs.

However, materials based on N-substituted maleimides involve a number of problems to solve such that the curing temperatures of these materials are as high as at least 200° C., adhesive properties thereof to inorganic materials and to metals are inferior, solubilities thereof in solvents are low, extensibilities or dispersibilities thereof in coating materials and the like are limited, and they are inferior in heat resistance to condensate type imides. Thus, the development of N-substituted maleimide materials is not necessarily advanced to satisfaction. On the other hand, there have been investigated in recent years applications of materials based on imides having terminal ethynyl groups to laminates and adhesives. But, there are also problems in flow properties of these materials at the time of shaping or curing.

U.S. Pat. No. 4,178,430 also describes a Shiff's compound terminated by ethynyl groups. This compound has aromatic rings and on heating forms a polymer having repeating acetylene-acetylene or en-in bonds in the molecular chain. According to this patent, this polymer is suited as a conductor or semiconductor. Furthermore, a mixture of the present polymer with silver powder can be used as a good conducter. Therefore it is doubtful to apply this polymer in the area of electronic components and electrical machinery where insulation resistance is required for the material to use. This polymer is produced through the following reaction:

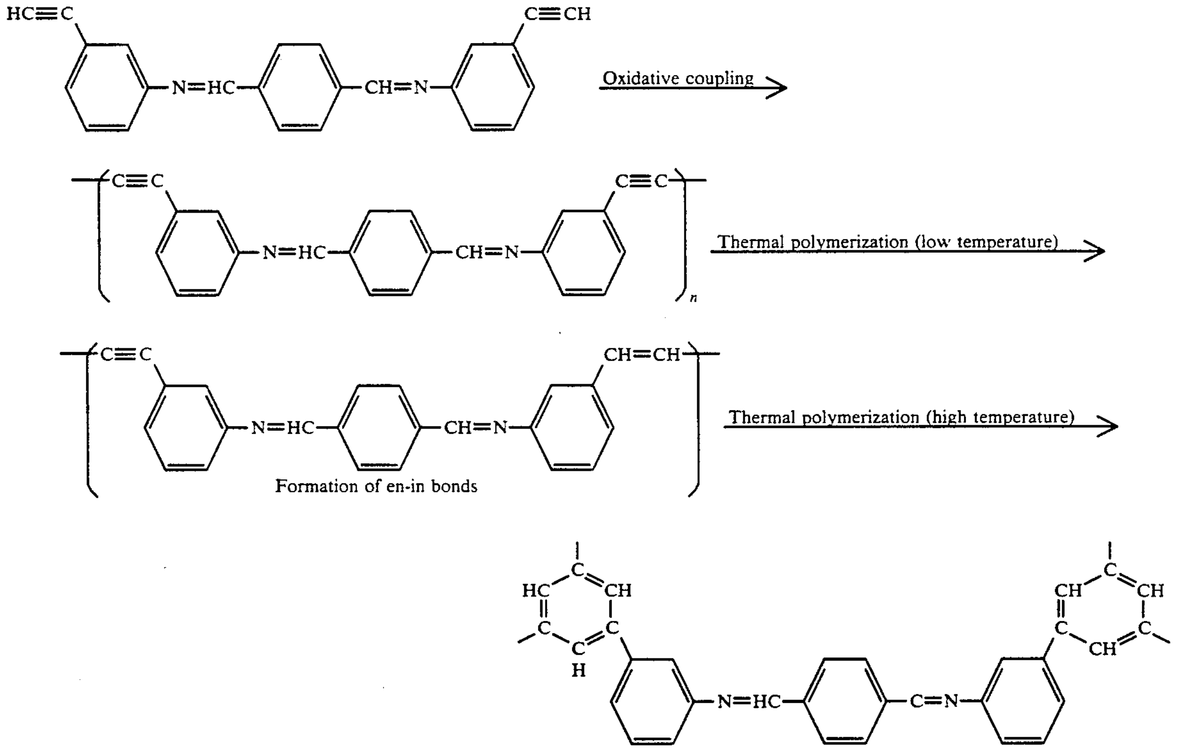

A disadvantage of the above prior art materials is that it is difficult to balance necessary properties such as heat resistance, moldability and processability, electrical-insulating properties for applications to electronic components or electrical machinery.

In particular, N-substituted maleimide-based polymers, which have been leading materials of the addition polymer type, have a drawback in that, when an attempt is made to balance the above-mentioned properties of these polymers, some deterioration of the heat resistance must be always accepted and hence it is not necessarily possible to achieve sufficiently the original object of further improving end products in performance and in reliability by applying these modified polymers.

OBJECTS AND SUMMARY OF THE INVENTION

The primary object of the invention is to provide a novel addition polymer type of material which can solve the above noted problems.

The above and other objects of the invention can be achieved by embodying the following aspects of the invention.

The present invention relates to polymers constructed mainly of dihydropyridine or dihydrotriazine rings, produced from a cyclization of a compound represented by the general formula $$X-(Z-Y-\alpha)_n$$

where n=1 or 2, α is selected from the group consisting of N≡C—NH—, N≡CO—, HC≡C—; wherein Z is —N=CH= or —CH=N—; wherein X and Y may be the same or different, and each is a member selected from the group consisting of linear and branched $C_1$-$C_{12}$ alkylene radicals, substituted and unsubstituted $C_1$-$C_{24}$ arylene radicals, and radicals of 4 to 8 member heterocyclic ring structures containing one or more nitrogen or oxygen atoms; wherein when n=2 the Y moeties may be the same or different.

The first aspect of the invention is a polymer constituted mainly of (i) dihydropyridine rings which are represented by the general formula

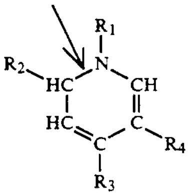 wherein; $R_1$ is $-CH_2-$ or

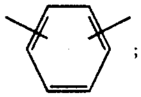 ; $R_2$ is —H, $-CH_3$, 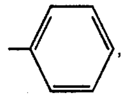,

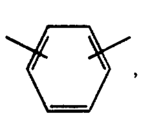, 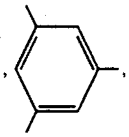, 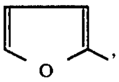,

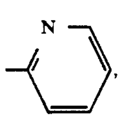, or 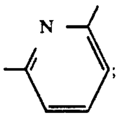;

and each of $R_3$ and $R_4$ is $-CH_2-$ or

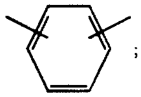 ;

or (ii) 1,2-dihydro-1,3,5-triazine rings which are represented by the general formula

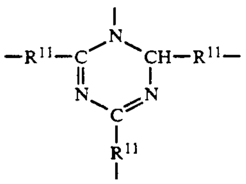

wherein $R^{11}$s are the same or different aromatic residues such as phenylene.

The second aspect of the invention is a polymer which is an embodiment of the above defined polymer and has a dihydropyridine ring-centered cross ladder-shaped structure, which is produced from a compound having an ethynyl group at each end of the molecule and at least two Schiff's bonds in the molecule, said compound being represented by the general formula $$HC\equiv C-Y_1-N=HC-X_1-CH=N-Y_2-C\equiv CH \quad [I]$$

wherein; $X_1$ is $-(CH_2)_m-$ (m denotes an integer of 1 to 12),

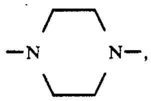, 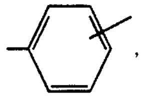,

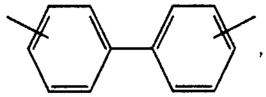, substituted-phenylene,

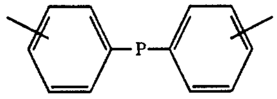

[P denotes

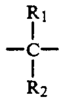

($R_1$ and $R_2$ are the same or different and represent each —H, $-CH_3$, $-C_2H_5$, $-CF_3$,

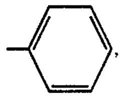, or 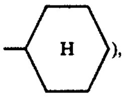), —O—, —CO—,

—S—, $-SO_2-$ or 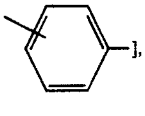], 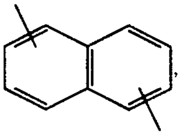,

-continued

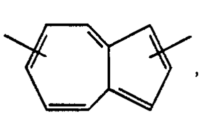, 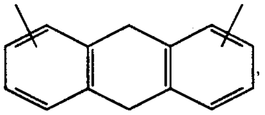,

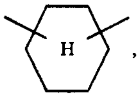, 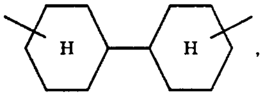,

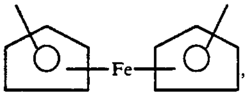, or

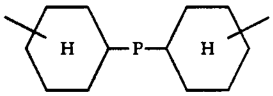

(P is as defined above); and $Y_1$ and $Y_2$ are the same or different divalent organic residues; by heating and reacting the compound at temperatures between 120° C. and 180° C.

The above dihydropyridine ring of this polymer is a 1,2,4,5-substituted-1,2-dihydropyridine ring:

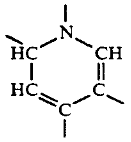

The dihydropyridine ring-centered cross ladder-shaped structure will be explained later.

The above divalent organic residues denoted by $Y_1$ and $Y_2$ include linear or branched $C_1$-$C_{12}$ alkylene groups and substituted or unsubstituted arylene groups, e.g. phenylene, naphthylene, biphenylene, anthrylene, phenanthrylene, azulene, pyrene,

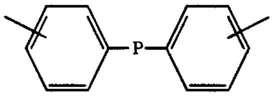

[P denotes

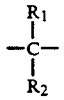

($R_1$ and $R_2$ are the same or different and denote each —H, —$CH_3$, —$C_2H_5$, —$CF_3$,

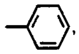, or 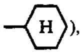), , or ],

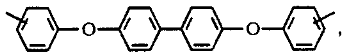, and

-continued

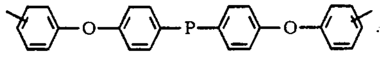.

(P defined above). Examples of the substituents that these arylene groups may have are the same as denoted above by $R_1$ and $R_2$. $Y_1$ and $Y_2$ further may be 5-membered or 6-membered heterocyclic rings such as

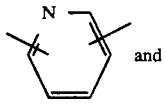 and 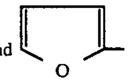.

$Y_1$ and $Y_2$ further may be

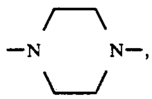, 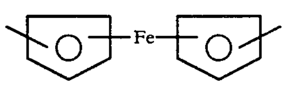

or the like.

The third aspect of the invention is a polymer which is another embodiment of the first aspect polymer and has a dihydropyridine ring-centered cross ladder-shaped structure, which is produced from a compound having an ethynyl group at each end of the molecule and at least two Shiff's bonds in the molecule, said compound being represented by the general formula $$HC{\equiv}C—Y_1—CH{=}N—X_2—N{=}CH—Y_2—C{\equiv}CH \quad [II]$$

wherein; X is $-(CH_2)_m-$ (m denotes an integer of 1 to 12),

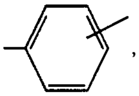, 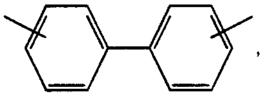,

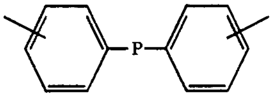

[P denotes

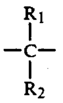

($R_1$ and $R_2$ are the same or different and represent each —H, —$CH_3$, —$C_2H_5$, —$CF_3$,

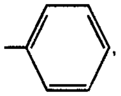, or 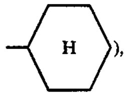),

—O—, —CO—, —S—, —$SO_2$—, or

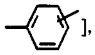], 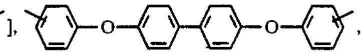,

-continued

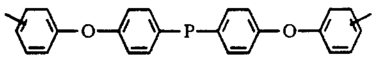

(P is as defined above),

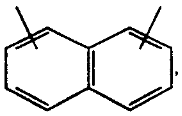, 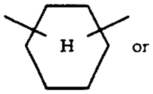 or

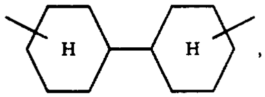,

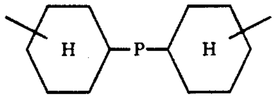

(P is as defined above); and $Y_1$ and $Y_2$ are the same or different divalent organic residues; by heating and reacting the compound at temperatures between 120° C. and 80° C.

The fourth aspect of the invention is a polymer which is another embodiment of the first aspect polymer and has a dihydropyridine ring-centered cross ladder-shaped structure, which is produced from a Schiff's compound(s) having an ethynyl group at one end of the molecule, said compound(s) being represented by the general formula $$X_2-CH=N-Y_3-C\equiv CH \quad [III]$$

and/or by the general formula $$X_2-N=CH-Y_3-C\equiv CH \quad [IV]$$

wherein; $X_2$ is —H, $C_1$-$C_8$ alkyl,

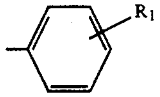

($R_1$ is —H, —F, —Cl, —Br, $-CH_3$, $-CF_3$, —OH, $-NH_2$,

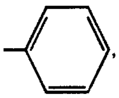, or 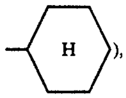), 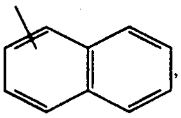, or

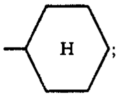;

and $Y_3$ is $-(CH_2)_m-$ (m is an integer of 1 to 12),

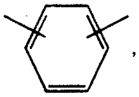, 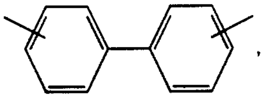,

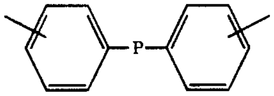

[P denotes $-(CH_2)_m-$ (m is as defined above), —O—, —CO—, —S—, $-SO_2-$,

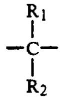

($R^1$ and $R^2$ are the same or different and denote each —H, $-CH_3$, $-C_2H_5-$, $-CF_3$,

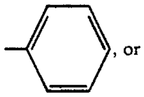, or 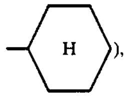), or 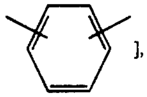],

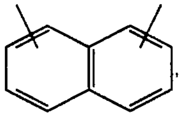, 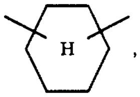,

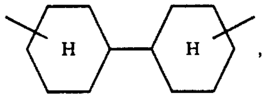, or

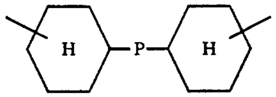

(P is as defined above); by heating the compound at temperatures between 120° C. and 180° C.

The fifth aspect of the invention is a polymer which is another embodiment of the first aspect polymer and has dihydrotriazine rings in particular, which is produced by heating a compound having a cyanato group at each end of the molecule and plural Schiff's bonds in the molecule, said compound being represented by the general formula $$N\equiv C-O-Y_1-N=HC-X_1-CH=N-Y_2-O-C\equiv N \quad [V]$$

wherein; $X_1$ is $-(CH_2)_m-$ (m is an integer of 1 to 12),

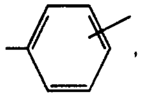, 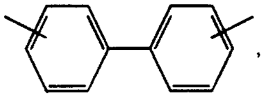,

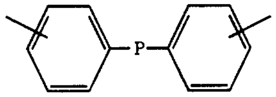

[P denotes

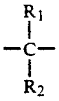

($R_1$ and $R_2$ are the same or different and denote each —H, —$CH_3$, —$C_2H_5$, —$CF_3$,

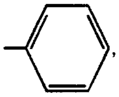, or 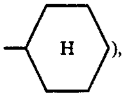),

—O—, —CO—, —S—, or —$SO_2$—],

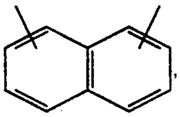, or 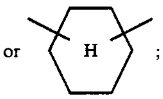;

and $Y_1$ and $Y_2$ are the same or different divalent organic residues.

The sixth aspect of the invention is a polymer which is another embodiment of the first aspect polymer and has dihydrotriazine rings in particular, which is produced by heating a compound having a cyanato group at each end of the molecule and plural Schiff's bonds in the molecule, said compound being represented by the general formula $$N{\equiv}C{-}O{-}Y_1{-}CH{=}N{-}X_2{-}N{=}CH{-}Y_2{-}O{-}C{\equiv}N \quad [VI]$$

wherein; $X_2$ is $-(CH_2)_m-$ (m is an integer of 1 to 12),

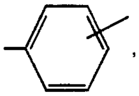, 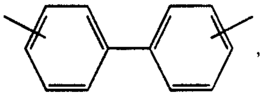, substituted-phenylene,

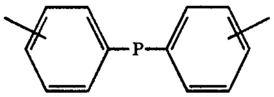

[P denotes

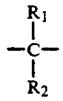

($R_1$ and $R_2$ are the same or different and denote each —H, —$CH_3$, —$C_2H_5$, —$CF_3$,

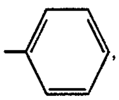, or 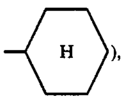),

—O—, —CO—, —S—, or —$SO_2$—],

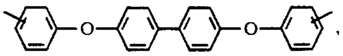,

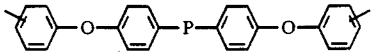

(P is as defined above),

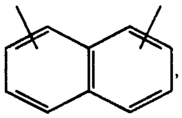,

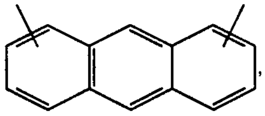,

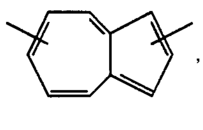,

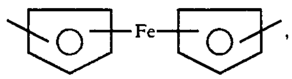, or 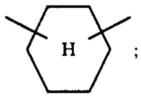;

and $Y_1$ and $Y_2$ are the same or different divalent organic residues.

The seventh aspect of the invention is a polymer which is a further embodiment of the first aspect polymer and has dihydrotriazine rings in particular, which is produced by heating a Schiff's compound(s) having a cyanato group at one end of the molecule, said compound(s) being represented by the general formula $$X_3{-}CH{=}N{-}Y_3{-}O{-}C{\equiv}N \quad [VII]$$

and/or by the general formula $$X_3{-}N{=}CH{-}Y_3{-}O{-}C{\equiv}N \quad [VIII]$$

wherein; $X_3$ is —H, $C_1$-$C_8$ alkyl,

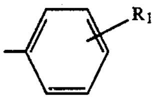

($R_1$ denotes —H, —F, —Cl, —Br, —$CH_3$, —OH, —$NH_2$,

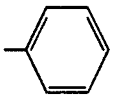, or 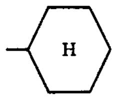),

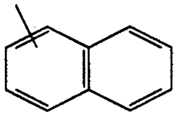, or 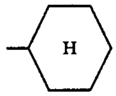;

and $Y_3$ is $—CH_2)_m$ (m is an integer of 1 to 12),

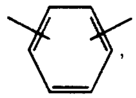, 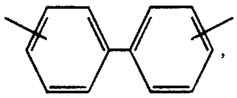,

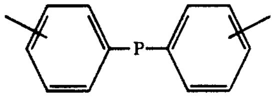

[P denotes $-(CH_2)_m$ (m is as defined above), —O—, —CO—, —S—, $—SO_2—$,

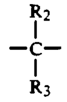

($R_2$ and $R_3$ are the same or different and denote each —H, $—CH_3$, $—C_2H_5$, $—CF_3$,

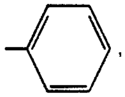, or 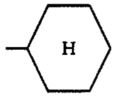) or 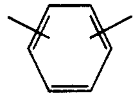],

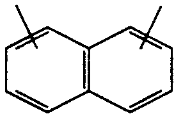, or 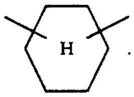.

The eighth aspect of the invention is a compound useful as the raw material of the fifth aspect polymer, that is, the compound represented by the above general formula [V], having a cyanato group at each end of the molecule and plural Schiff's bonds in the molecule.

The ninth aspect of the invention is a compound useful as the raw material of the sixth aspect polymer, that is, the compound represented by the above general formula [VI], having a cyanato group at each end of the molecule and plural Schiff's bonds in the molecule.

The tenth aspect of the invention is a compound useful as the raw material of the seventh aspect polymer, that is, the compound represented by the above general formula [VII] or [VIII], having a cyanato group at one end of the molecule and plural Schiff's bonds in the molecule.

The eleventh aspect of the invention is a process for producing a polymer having dihydropyridine rings or dihydrotriazine rings defined above, the process comprising reaction by heating a compound represented by the general formula [I] to [VIII].

The twelveth aspect of the invention is a copper-clad laminate formed by superposing in turn a copper foil, sheets of prepreg, and a copper foil and applying heat and pressure to the whole layer, wherein the prepreg contains a polymer consisting of repeating units which are constituted mainly of (i) dihydropyridine rings represented by the general formula

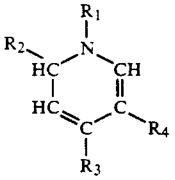

wherein; $R_1$ is $—CH_2—$ or 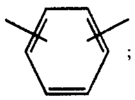; $R_2$ is —H, $—CH_3$, 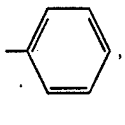, 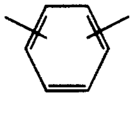 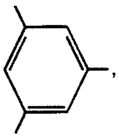,

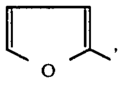, 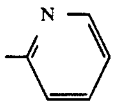, or 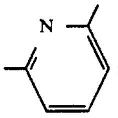;

and each of $R_3$ and $R_4$ is $—CH_2—$ or 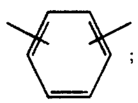; or (ii) 1,2-dihydro-1,3,5-triazine rings represented by the general formula

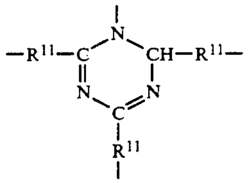

wherein $R^{11}$s are the same or different aromatic residues such as phenylene.

The thirteenth aspect of the invention is a slippery member formed by overlaying a steel strap with a porous layer and subsequently with a lubricating coat consisting mainly of a resin, wherein said resin is all or partly made up of a polymer which is constituted mainly of dihydropyridine rings or 1,2-dihydro-1,3,5-triazine rings defined above.

The fourteenth aspect of the invention is a molecular orientation controlling coat for a liquid crystal display device, said coat being an organic film formed on a transparent electroconductive film, wherein said organic film comprises a polymer which is constituted mainly of dihydropyridine rings or 1,2-dihydro-1,3,5-triazine rings defined above.

The fifteenth aspect of the invention is a powder-coating material comprising an organic material and an inorganic additive, wherein the organic material contains a component which, on curing, forms dihydropyridine rings or 1,2-dihydro-1,3,5-triazine rings defined above.

The sixteenth aspect of the invention is a filler comprising a finely pulverized polymer which is constituted mainly of dihydropyridine rings or 1,2-dihydro-1,3,5-triazine rings defined above.

The seventeenth aspect of the invention is a resin-sealed type of semiconductor device produced by covering at least the surface of the semiconductor component with a hardened resin, wherein the hardened resin is all or partly made up of a polymer which is constituted mainly of dihydropyridine rings or 1,2-dihydro-1,3,5-triazine rings defined above.

The eighteenth aspect of the invention is an adhesive consisting of a resin solution in a solvent, wherein said resin comprises a component which, on curing, forms a polymer constituted mainly of dihydropyridine rings or 1,2-dihydro-1,3,5-triazine rings defined above.

BRIEF DESCRIPTION OF THE DRAWINGS

In FIGS. 1 to 3; 1 . . . Lead wire, 2 . . . Semiconductor, 3 . . . Protective coating resin, 3-I . . . First protective coating resin, 3-II . . . Second protective coating resin, 4-I . . . First layer wiring, 4-II . . . Second layer wiring, 5 . . . Polyimide resin, 6 . . . Molded resin, 7 . . . Thermally oxidized film

DETAILED DESCRIPTION OF PREFERRED EMBODIMENTS

Figure 1:
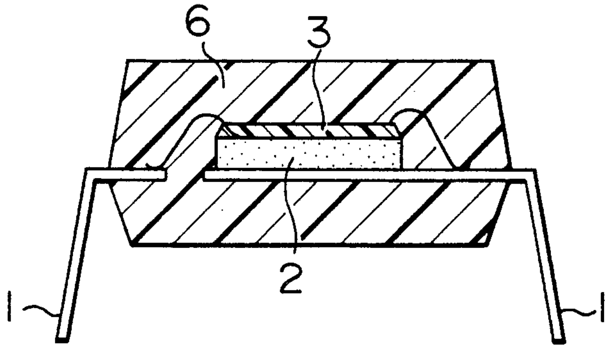
FIG. 1 is a cross-sectional view of a semiconductor device prepared in an example of the present invention.

The present inventive compounds having Schiff's bonds are synthesized generally in the following ways, though not limited thereto, of course.

Compounds represented in the invention by the general formula $$HC{\equiv}C{-}Y_1{-}N{=}HC{-}X_1{-}CH{=}N{-}Y_2{-}C{\equiv}CH \qquad [I]$$

wherein; $X_1$ is $-(CH_2)_m-$ (m is an integer of 1 to 12),

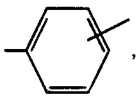, 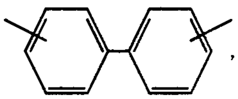,

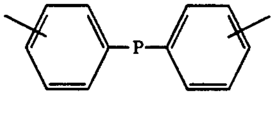

[P denotes

($R_1$ and $R_2$ are the same or different and denote each —H, $-CH_3$, $-C_2H_5$, $-CF_3$,

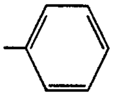, or 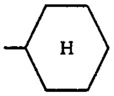),

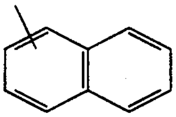, or 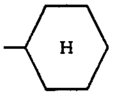;

—O—, —CO—, —S—, $-SO_2-$, or

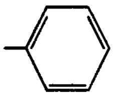],
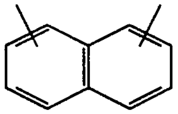,

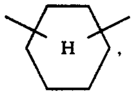, 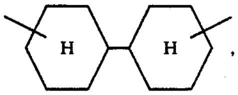, or 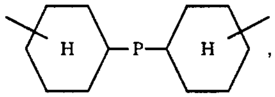, (P is as defined above); and $Y_1$ and $Y_2$ are the same or different divalent organic residues; the compounds having an ethynyl group at each end of the molecule and at least two Schiff's bonds in the molecule, can be synthesized very easily by the reaction represented by the following equation:

$$OCH{-}X_1{-}CHO + H_2N{-}Y_1{-}C{\equiv}CH + H_2N{-}Y_2{-}C{\equiv}CH \xrightarrow[\text{at room temp. } \sim 100^\circ \text{ C}]{\text{in solvent}} \text{Compound [I]}$$

wherein, $X_1$, $Y_1$, and $Y_2$ are as defined above. Compounds represented by the general formula $$HC{\equiv}C{-}Y_1{-}CH{=}N{-}X_2{-}N{=}CH{-}Y_2{-}C{\equiv}CH \qquad [II]$$

wherein; $X_2$ is $-(CH_2)_m-$ (m is an integer of 1 to 12),

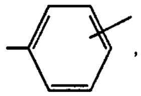, 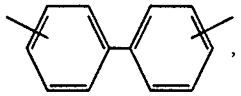,

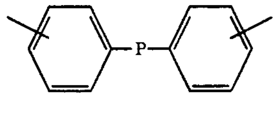

[P denotes

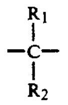

($R_1$ and $R_2$ are the same or different and denote each —H, —$CH_3$, —$C_2H_5$, —$CF_3$,

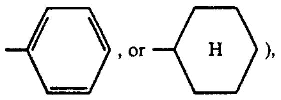

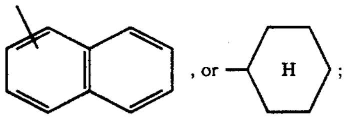

—O—, —CO—, —S—, —$SO_2$—, or

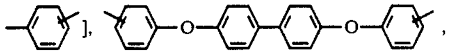

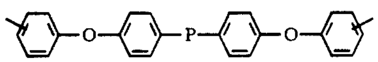

(P is as defined above),

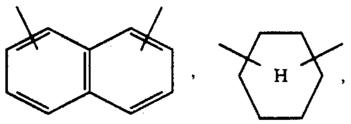

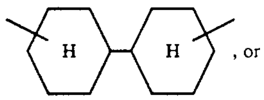

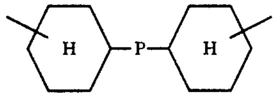

(P is as defined above); and $Y_1$ and $Y_2$ are the same or different divalent organic residues; the compounds having an ethynyl group at each end of the molecule and at least two Shiff's bonds in the molecule, can be synthesized by the reaction represented by the following equation:

$$OHC-Y_1-C\equiv CH + OHC-Y_2-C\equiv CH + H_2N-X_2-NH_2 \xrightarrow[\text{at room temp.} \sim 100^\circ \text{ C}]{\text{in solvent}} \text{Compound [II]}$$

wherein, $Y_1$, $Y_2$, and $X_2$ are as defined above. Schiff's compounds represented by the general formula $$X_3-CH=N-Y_3-C\equiv CH \quad \text{[III]}$$

or by the general formula $$X_3-N=CH-Y_3-C\equiv CH \quad \text{[IV]}$$

wherein; $X_3$ is —H, $C_1$-$C_8$ alkyl,

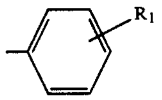

($R_1$ is —H, —F, —Cl, —Br, —$CH_3$, —$CF_3$, —OH, —$NH_2$,

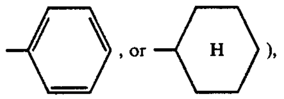

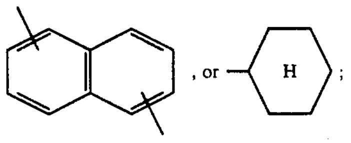

and $Y_3$ is $-(CH_2)_m-$ (m is an integer of 1 to 12),

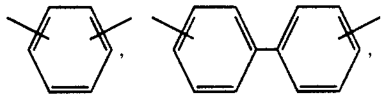

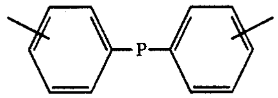

[P is $-(CH_2)_m-$ (m is as defined above), —O—, —CO—, —S—, —$SO_2$—,

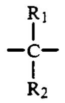

($R_1$ and $R_2$ are the same or different and denote each —H, —$CH_3$, —$C_2H_5$, —$CF_3$,

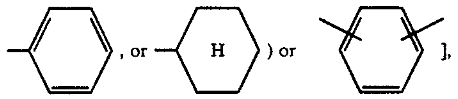

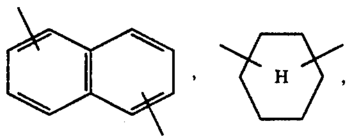

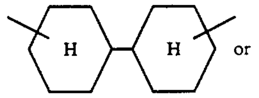

-continued

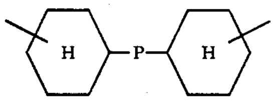

(P is as defined above); the compounds having an ethynyl group at one end of the molecule, can be synthesized by reacting monofunctional aldehyde compounds with amino ethynyl compounds, as shown by the following equations 1 to 6, in solvents at temperatures between ambient and 100° C.

1. 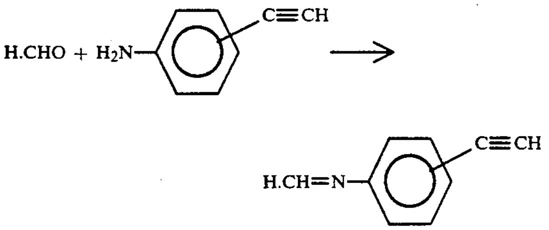

2. 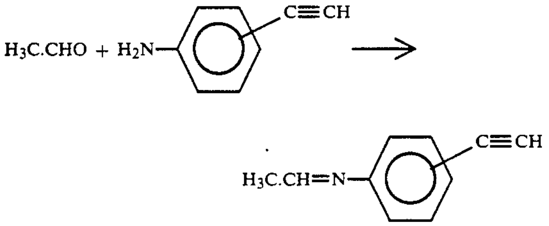

3. 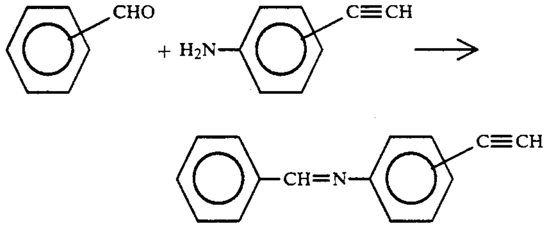

4. $H.CHO + H_2N\text{-}(CH_2)_m\text{-}C{\equiv}CH \longrightarrow H.CH{=}N\text{-}(CH_2)_m\text{-}C{\equiv}CH$ 5. $H_3C.CHO + H_2N\text{-}(CH_2)_m\text{-}C{\equiv}CH \longrightarrow H_3C.CH{=}N\text{-}(CH_2)_m\text{-}C{\equiv}CH$ 6. 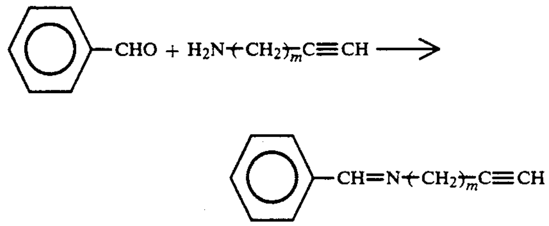

Compounds represented by the general formula [V]

$$N{\equiv}C\text{—}O\text{—}Y_1\text{—}N{=}HC\text{—}X_1\text{—}CH{=}N\text{—}Y_2\text{—}O\text{—}C{\equiv}N \qquad [V]$$

wherein; $X_1$ is $—(—CH_2—)—_m$ (m is an integer of 1 to 12),

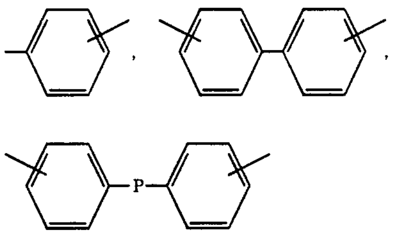

[P denotes

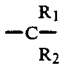

($R_1$ and $R_2$ are the same or different and denote each —H, $—CH_3$, $—C_2H_5$, $—CF_3$,

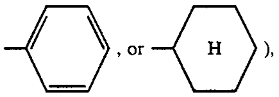

, or ),

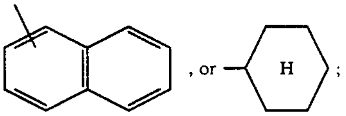

, or ;

—O—, —CO—, —S—, or $—SO_2—$],

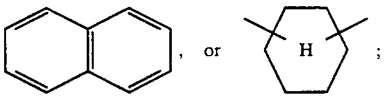

, or ;

and $Y_1$ and $Y_2$ are the same or different divalent organic resiudes; which have a cyanato group at each end of the molecule and plural Schiff's bonds in the molecule, can be synthesized, for instance, through the following reaction process:

$$OHC\text{—}X_1\text{—}CHO + H_2N\text{—}Y_1\text{—}OH + H_2N\text{—}Y_2\text{—}OH \xrightarrow[\text{at room temp. } \sim 100^\circ\text{ C.}]{\text{in NMP (N-Methylpyrrolidone)}}$$

$$HO\text{—}Y_1\text{—}N{=}CH\text{—}X_1\text{—}CH{=}N\text{—}Y_2\text{—}OH \xrightarrow[N(Et)_3]{Br\text{—}C{\equiv}N}$$

$$N{\equiv}C\text{—}O\text{—}Y_1\text{—}N{=}CH\text{—}X_1\text{—}CH{=}N\text{—}Y_2\text{—}O\text{—}C{\equiv}N$$

wherein, $X_1$, $Y_1$, and $Y_2$ are as defined above.

Compounds represented by the general formula $$N{\equiv}C\text{—}O\text{—}Y_1\text{—}CH{=}N\text{—}X_2\text{—}N{=}CH\text{—}Y_2\text{—}O\text{—}C{\equiv}N \qquad [VI]$$

wherein; $X_2$ is $\text{-}(CH_2)_m\text{-}$ (m is an integer of 1 to 12),

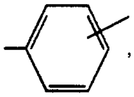, ,

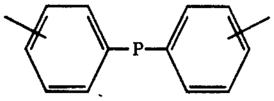

[P denotes

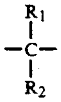

($R_1$ and $R_2$ are the same or different and denote each $-H$, $-CH_3$, $-C_2H_5$, $-CF_3$,

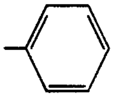, or 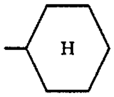),

—O—, —CO—, —S—, $-SO_2-$, or

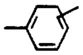],

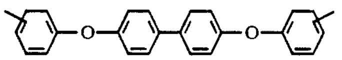,

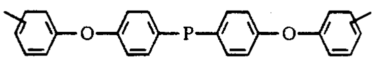

(P is as defined above),

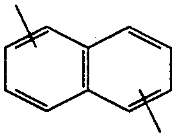, or 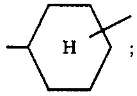;

and $Y_1$ and $Y_2$ are the same or different divalent organic residues; which have a cyanato group at each end of the molecule and plural Schiff's bonds in the molecule, can be synthesized, for instance, through the following reaction process:

$OHC-Y_1-OH + OHC-Y_2-OH +$ $H_2N-X_2-NH_2$ in NMP at room temp. ~100° C.

$HO-Y_1-CH=N-X_2-N=CH-Y_2-O-C\equiv N$ $Br-C\equiv N$ $N(Et)_3$ $N\equiv C-O-Y_1-CH=N-X_2-N=CH-Y_2-O-C\equiv N$ Schiff's compounds represented by the general formula $X_3-CH=N-Y_3-O-C\equiv N$ [VII]

or by the general formula $X_3-N=CH-Y_3-O-C\equiv N$ [VIII]

wherein; X is —H, $C_1$-$C_8$ alkyl,

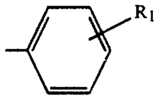

($R_1$ denotes —H, —F, —Cl, —Br, $-CH_3$, $-CF_3$, —OH, $-NH_2$,

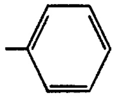, or 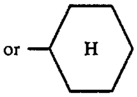),

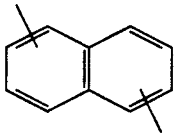, or 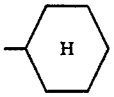;

and Y is $-(CH_2)_m-$ (m is an integer of 1 to 12),

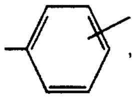, 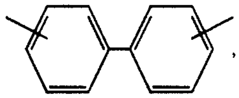,

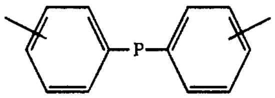

[P denotes $-(CH_2)_m-$ (m is as defined above), —O—, —CO—, —S—, $-SO_2-$,

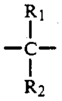

($R_1$ and $R_2$ are the same or different and denote each —H, $-CH_3$, $-C_2H_5$, $-CF_3$, 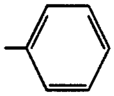, or

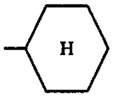), or 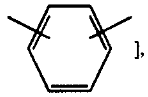],

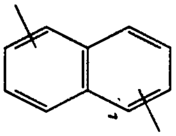, or 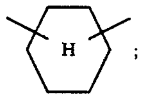;

which have a cyanato group at one end of the molecule; can be synthesized by reacting the compounds, obtained by reacting monofunctional aidehyde compounds and aminophenol compounds or aliphatic aminoalcohol compounds in solvents at temperatures of ambient to 100° C. as illustrated by the following reaction equations 1 to 6, with cyanogen halides (e.g., BrC≡N) in the presence of tertiary amines.

1. 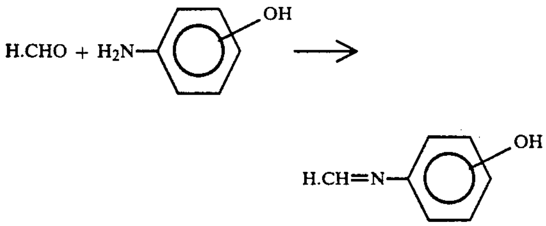

2. 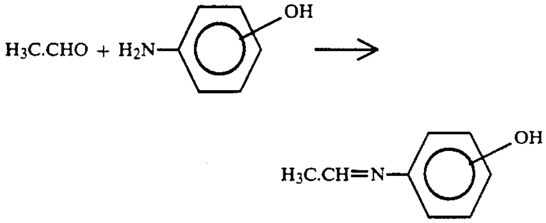

3. 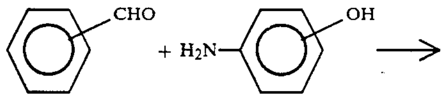

-continued

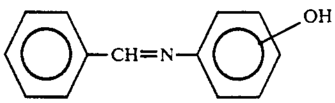

4. $H.CHO + H_2N\!-\!(CH_2)_m\!-\!OH \longrightarrow H.CH{=}N\!-\!(CH_2)_m\!-\!OH$ 5. $H_3C.CHO + H_2N\!-\!(CH_2)_m\!-\!OH \longrightarrow H_3C.CH{=}N\!-\!(CH_2)_m\!-\!OH$ 6. 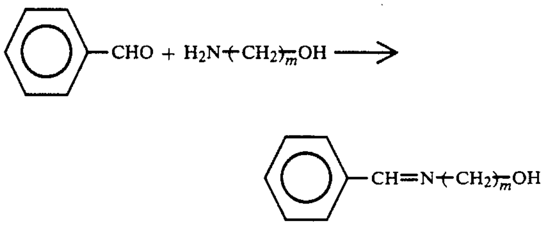

The following are examples of the reaction to produce individual ethynyl-terminated Schiff's compounds represented by the general formula [I], [II], [III], or [IV].

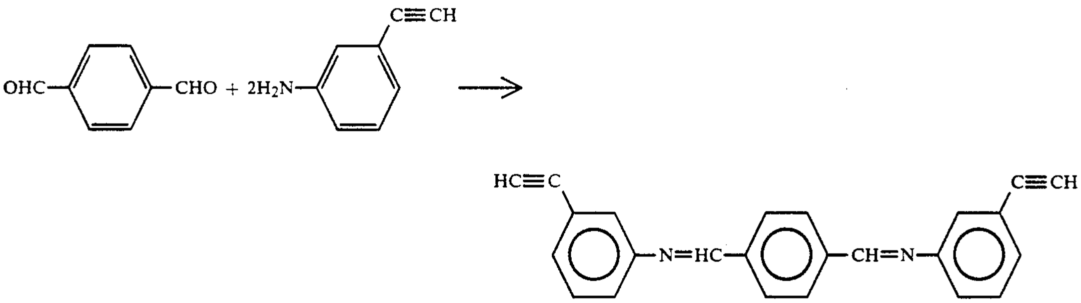
(1)

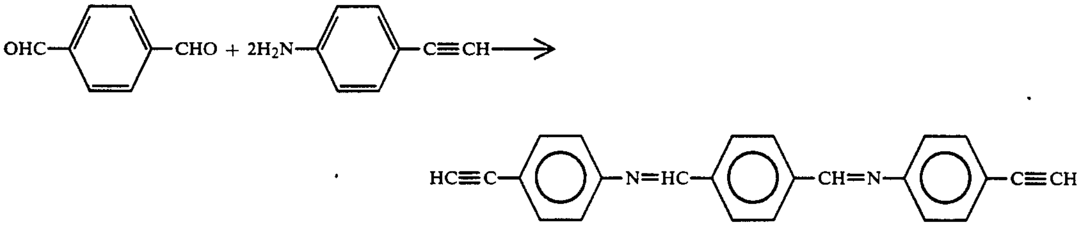
(2)

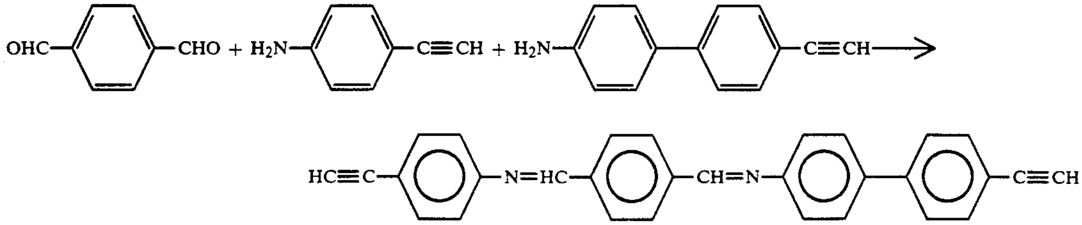
(3)

-continued
(4)
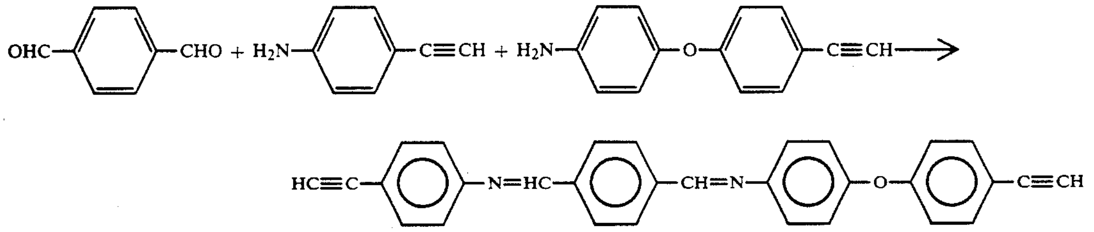
(5)
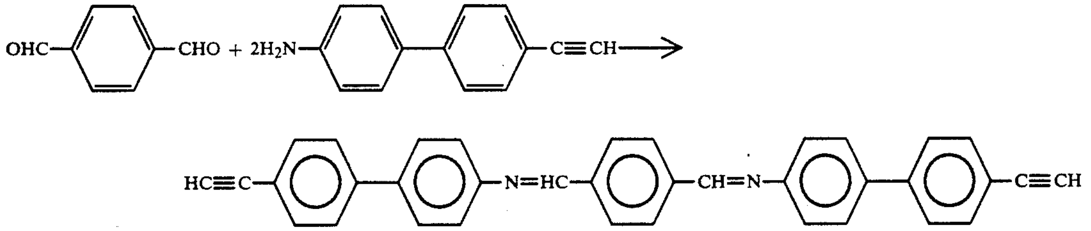
(6)
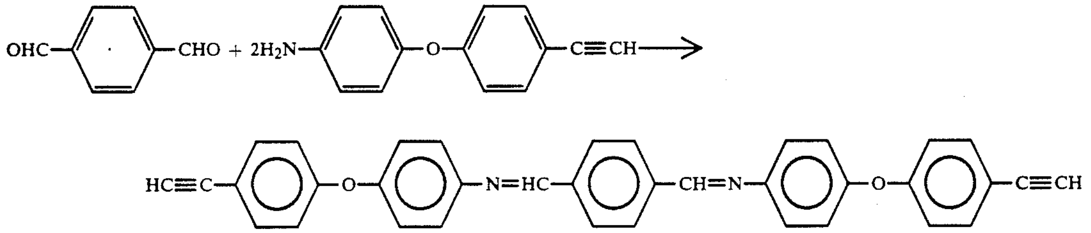
(7)
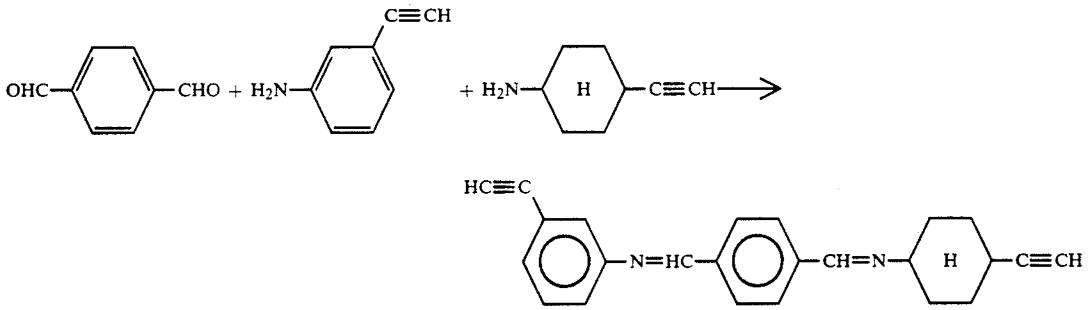
(8)
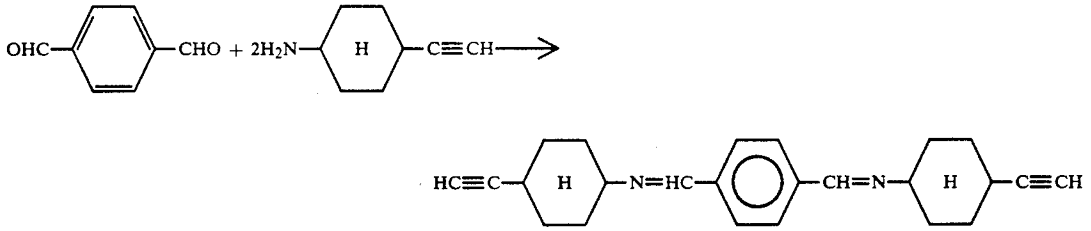
(9)
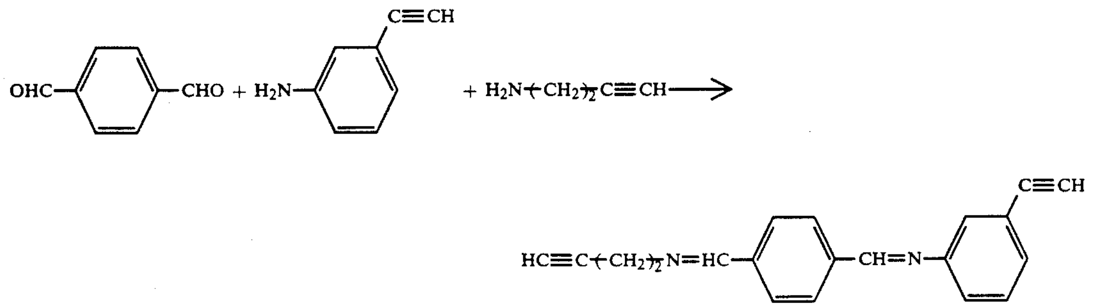

-continued
(10)
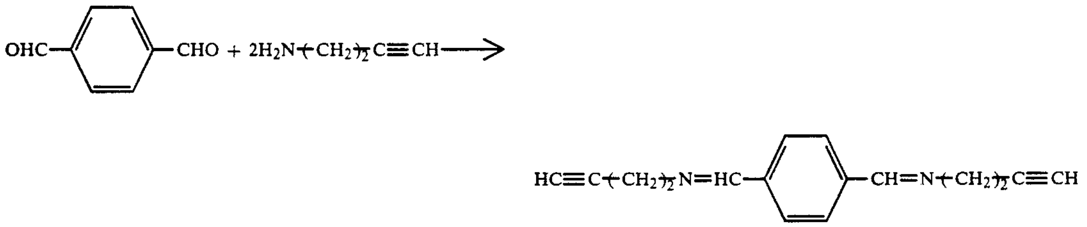
(11)
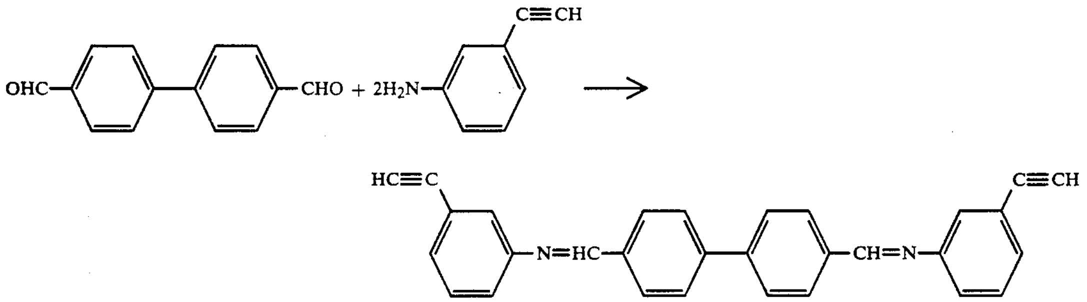
(12)
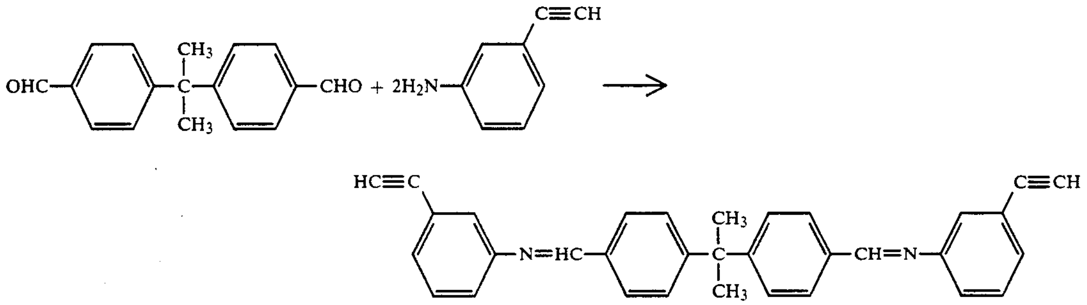
(13)
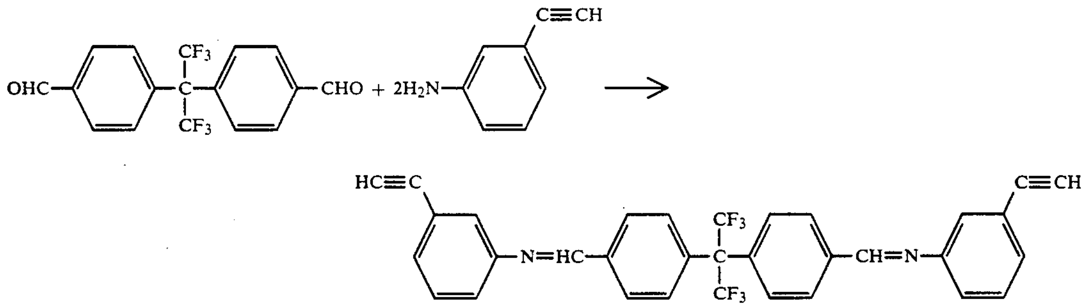
(14)
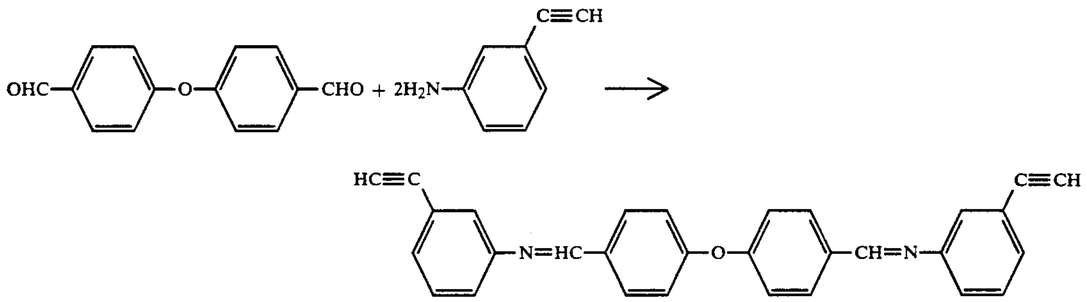
(15)
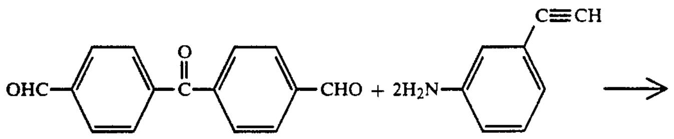

-continued
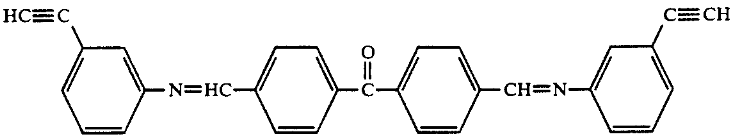
(16)
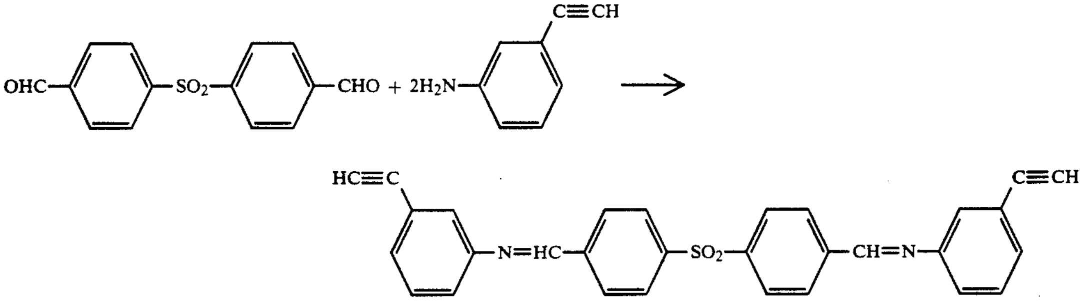
(17)
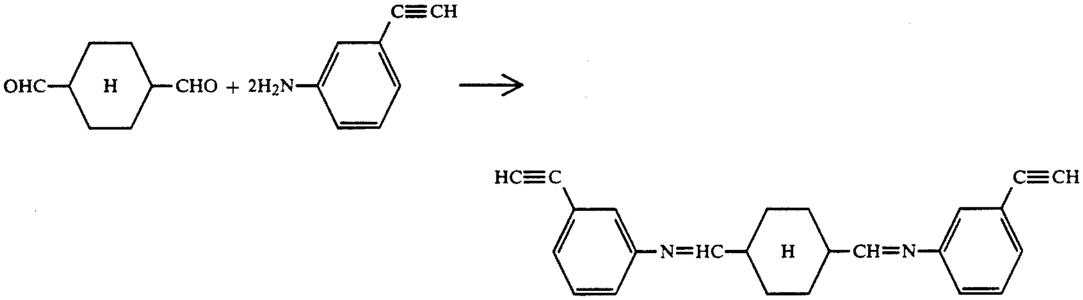
(18)
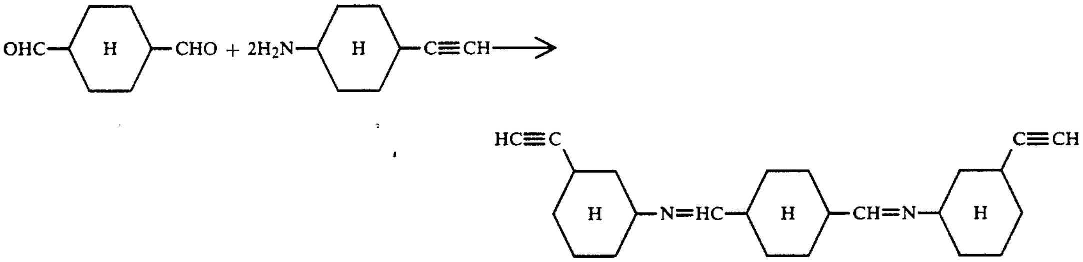
(19)
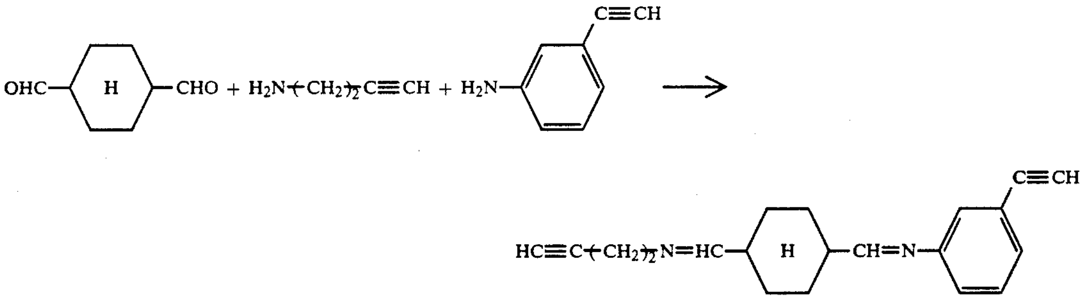
(20)
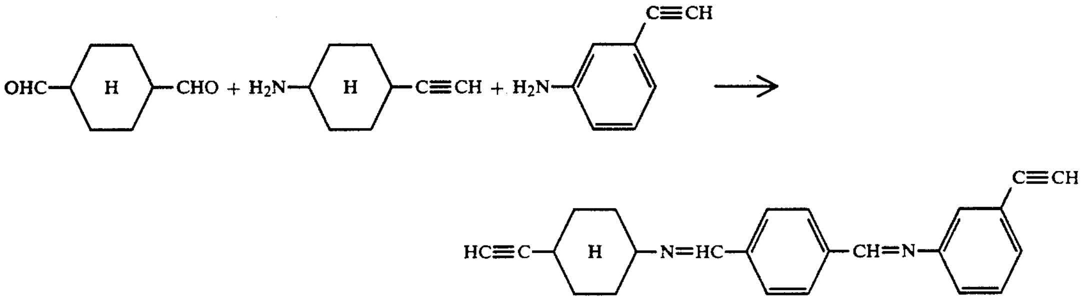

-continued
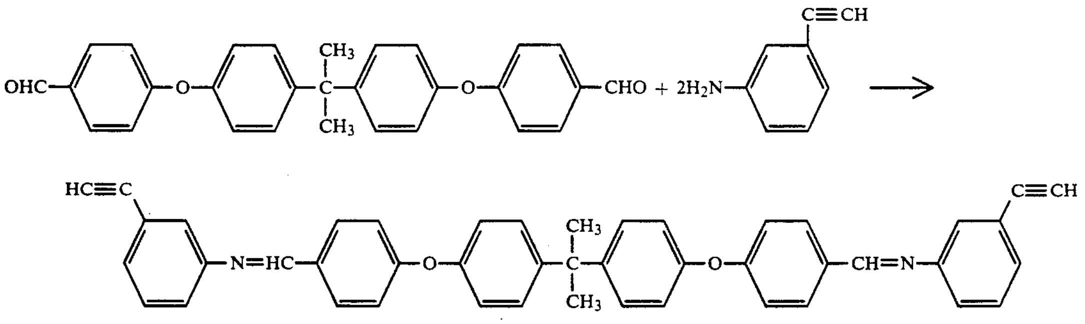
(21)
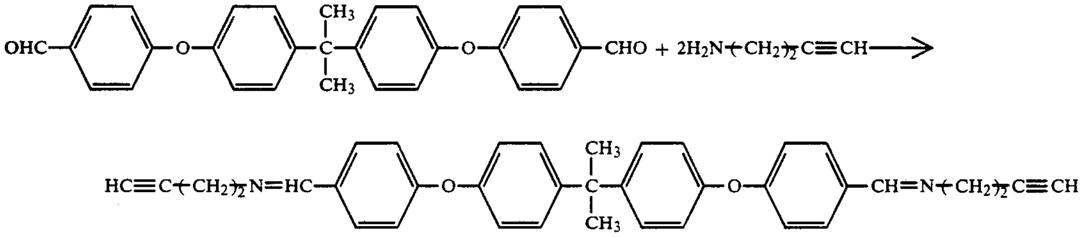
(22)
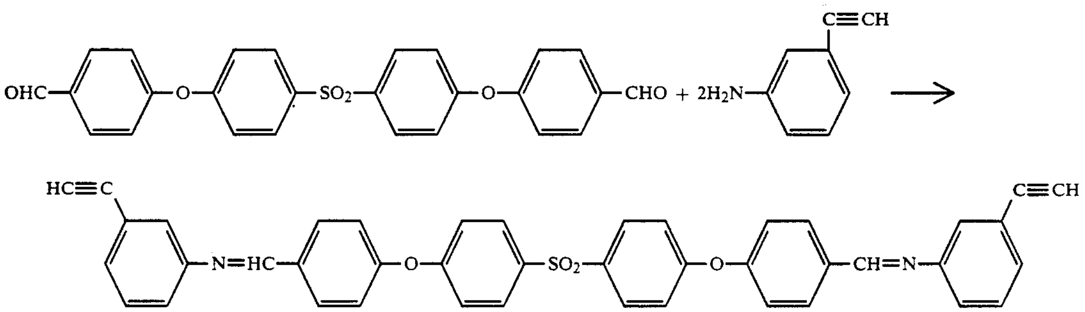
(23)
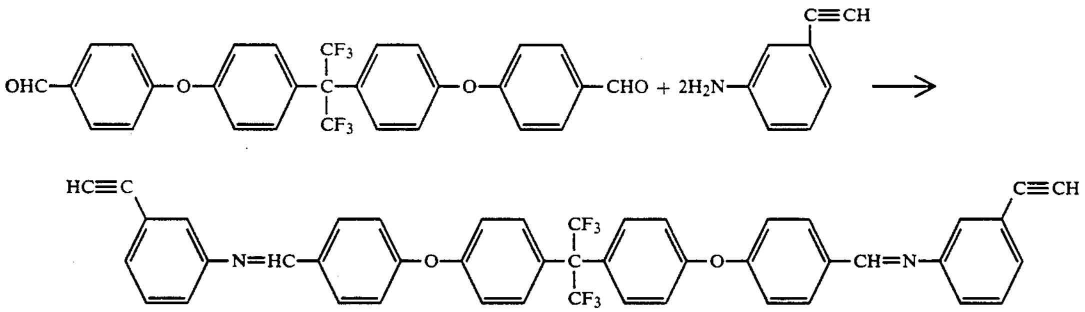
(24)
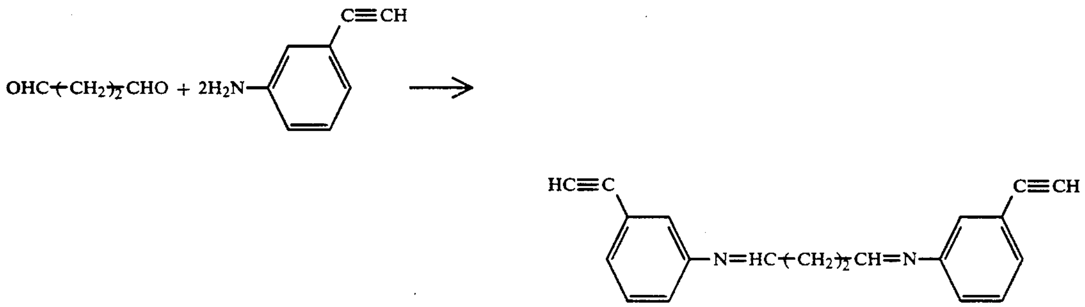
(25)
$OHC\text{-}(CH_2)_2\text{-}CHO + 2H_2N\text{-}(CH_2)_2\text{-}C{\equiv}CH \longrightarrow HC{\equiv}C\text{-}(CH_2)_2\text{-}N{=}HC\text{-}(CH_2)_2\text{-}CH{=}N\text{-}(CH_2)_2\text{-}C{\equiv}CH$ (26)

-continued
(27)
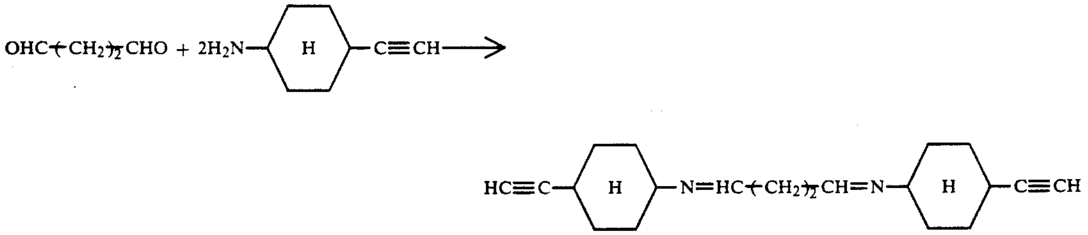
(28)
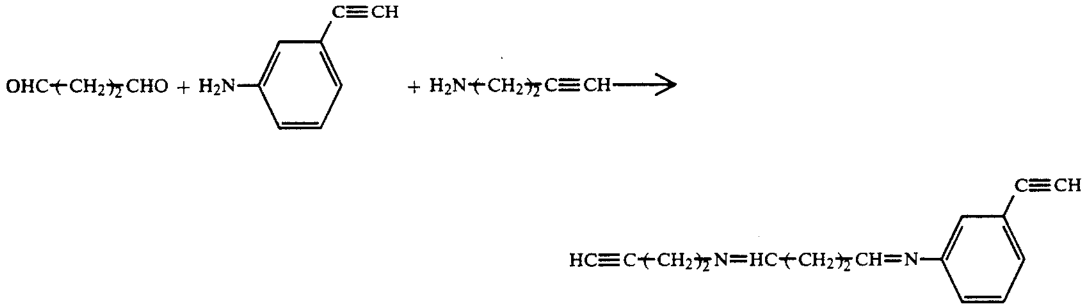
(29)
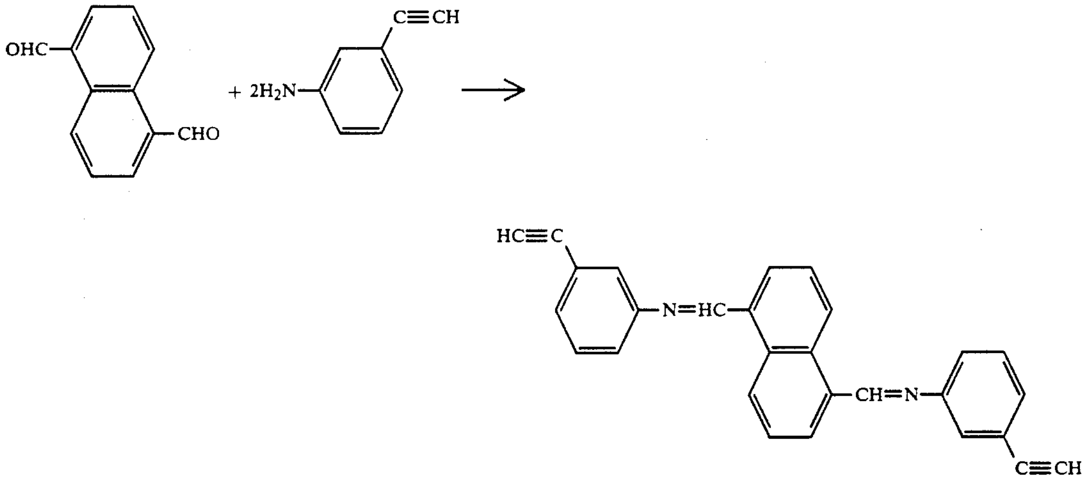
(30)
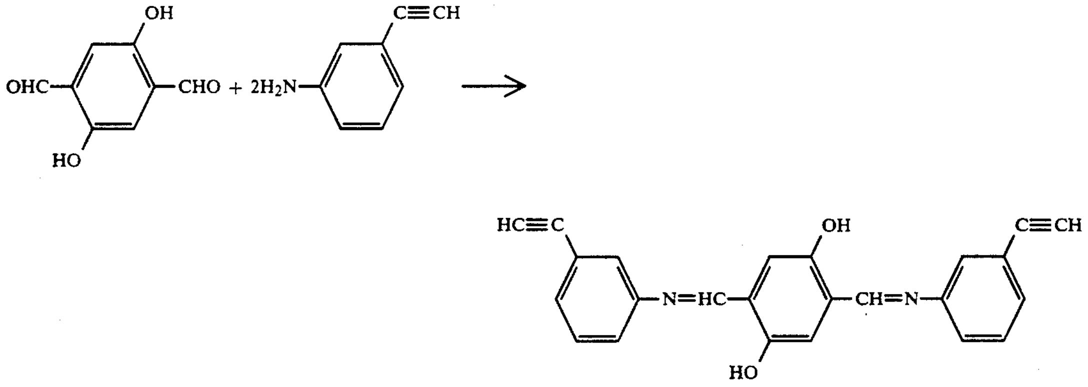
(31)
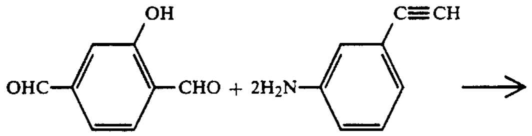

-continued
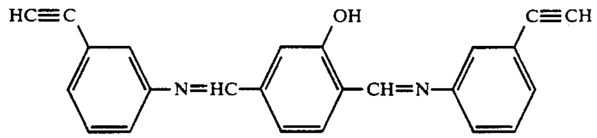
(32)
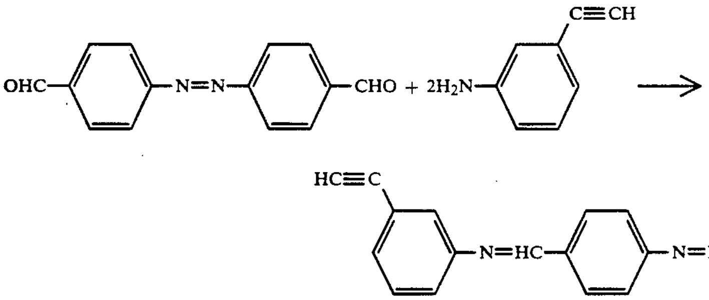
(33)
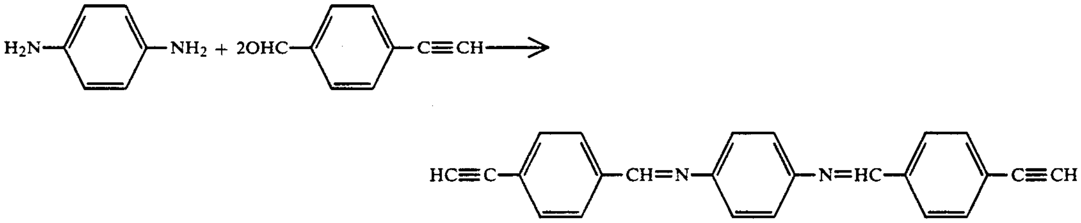
(34)
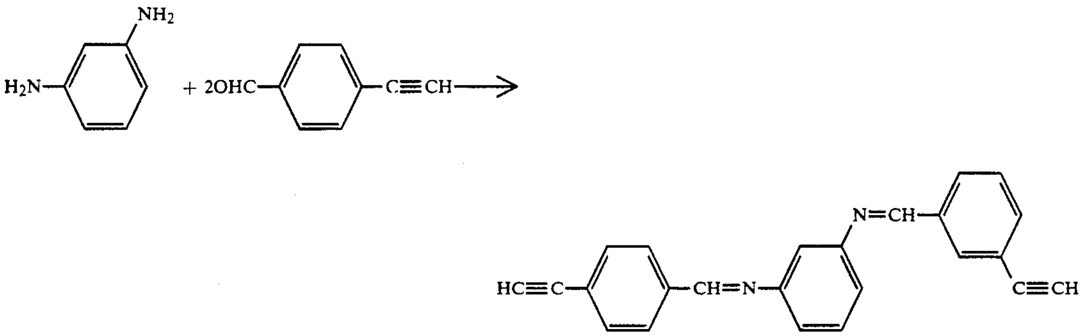
(35)
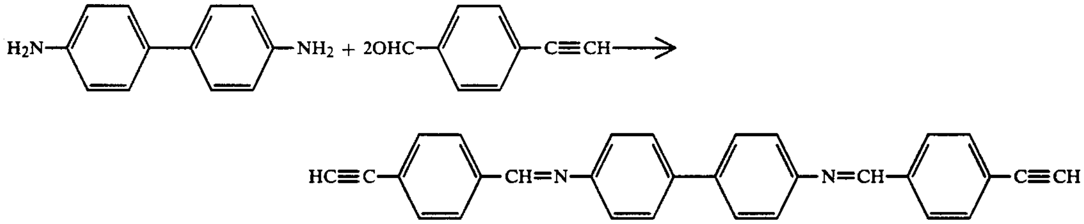
(36)
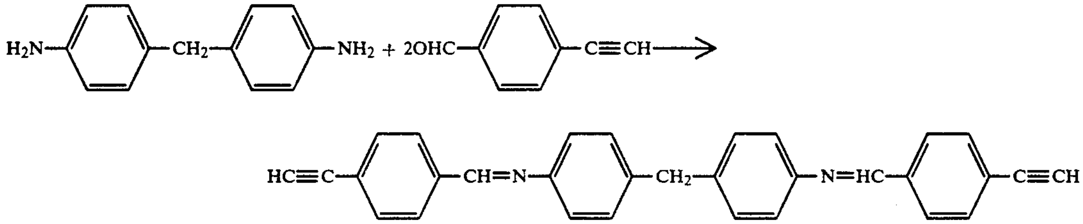
(37)
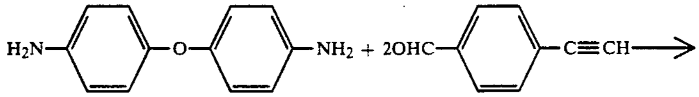

-continued
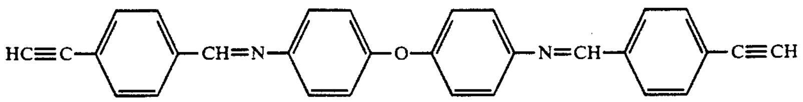
(38)
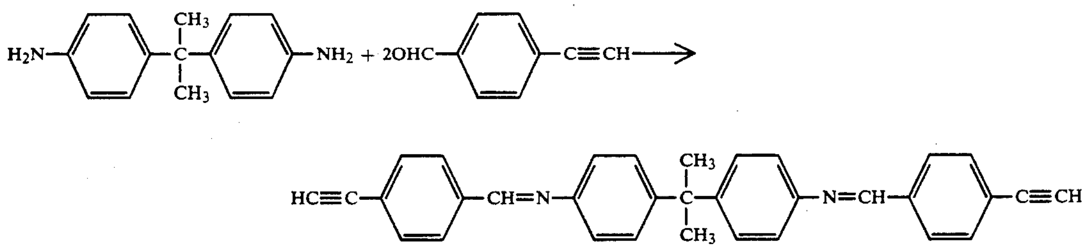
(39)
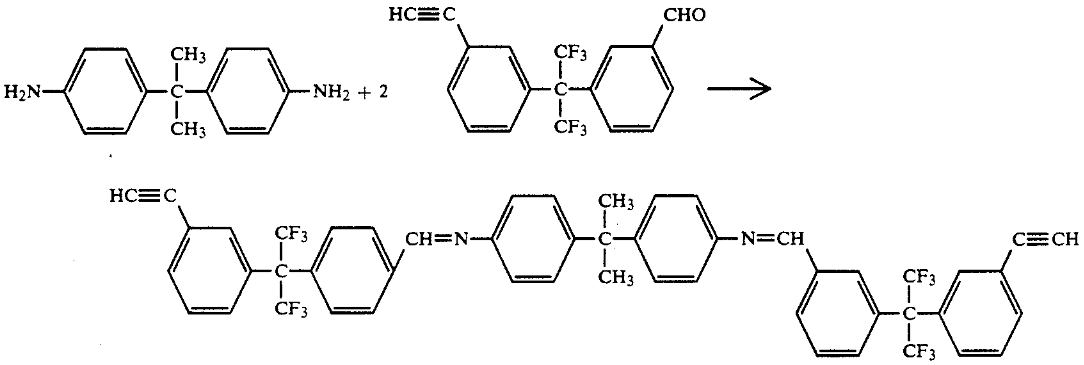
(40)
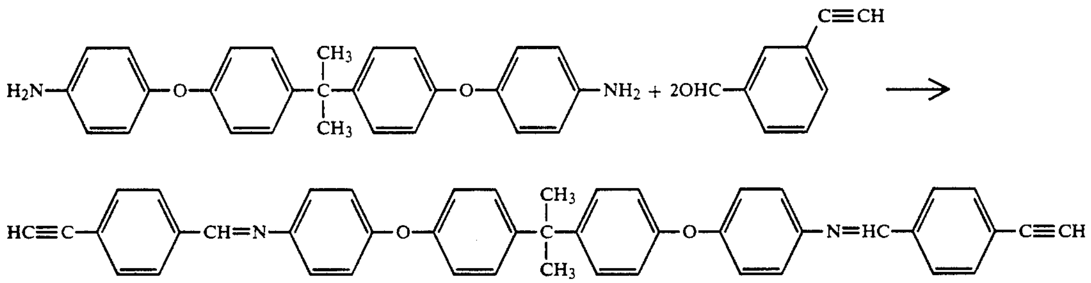
(41)
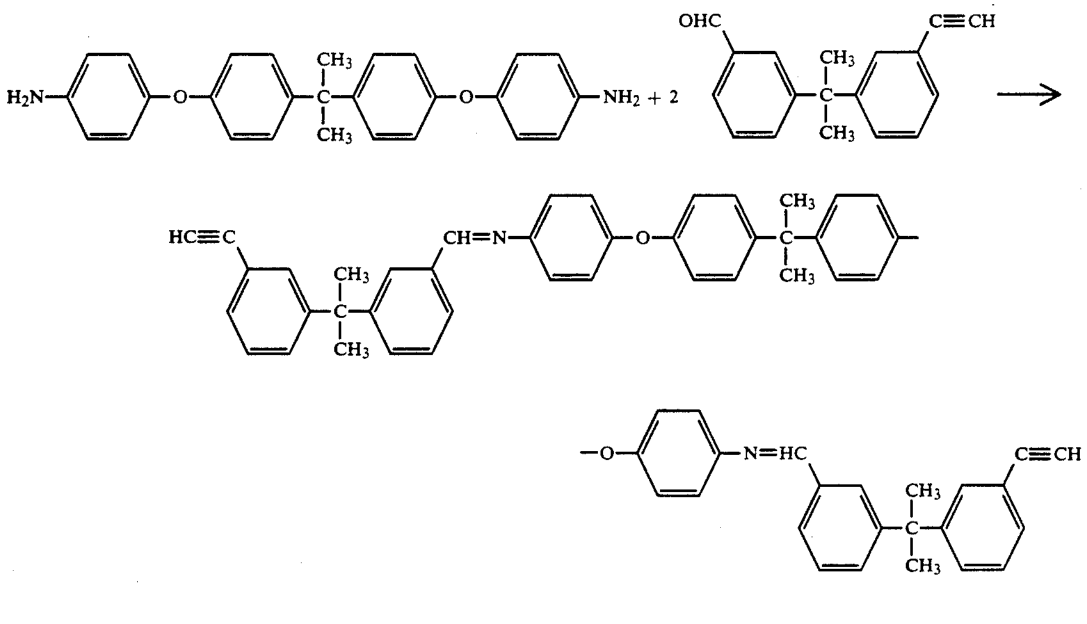

-continued (42)

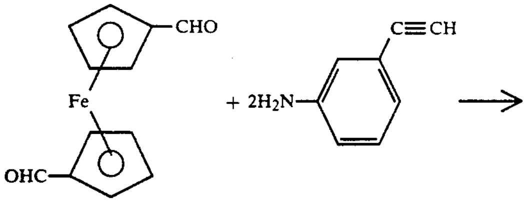

1,1'-diformylferrocene

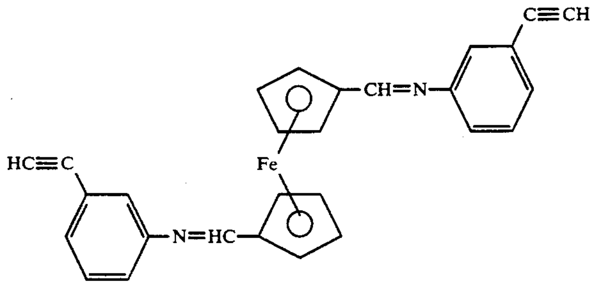

(43)

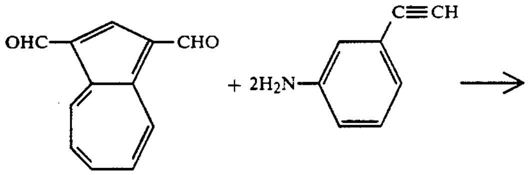

1,3-diformylazulene

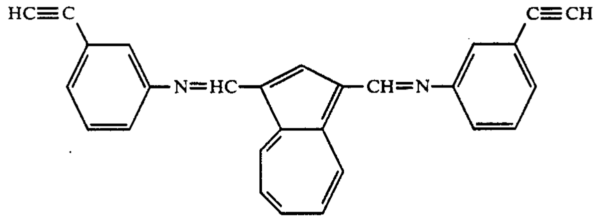

The present inventive Schiff's compounds represented by the general formula [V], [VI], [VII], or [VIII], which have terminal cyanato groups, can be synthesized, for instance, by reacting aldehyde compounds with aminophenol compounds and then reacting the resulting Schiff's compounds having terminal cyanato groups with a cyanogen halide such as Br—C≡N or Cl—C≡N in the presence of a tertiary amine such as triethylamine. Another synthetic method comprises reacting a cyanogen halide with aminophenol compounds in the state of their amino groups masked, and reacting the resulting amino cyanato compounds with aldehyde compounds to form Schiff's bonds. However, there is no particular restriction in the present invention on the method for synthesizing Schiff's compounds having terminal cyanato groups. Any suitable synthetic method may be used besides the above methods.

Aldehyde compounds which are essential ingredients to synthesize the present inventive compounds of formulae [I] to [VIII] include; aliphatic saturated aldehydes, e.g. formaldehyde, acetaldehyde, propionaldehyde, butyraldehyde, isobutyraldehyde, valeraldehyde, isovaleraldehyde, pivalaldehyde, caproaldehyde, heptoaldehyde; caprilaldehyde, pelargonaldehyde, capraldehyde, undecylaldehyde, lauraldehyde, dodecylaldehyde and stearaldehyde; aliphatic dialdehydes, e.g. glyoxal and succinaldehyde; ketoaldehydes, e.g. methylglyoxal, acetoacetaldehyde, levulinaldehyde, and phenylglyoxal; aliphatic unsaturated aldehydes, e.g. acrolein, crotonaldehyde, and propiolaldehyde; aromatic aldehydes, e.g. benzaldehyde, o-tolualdehyde, m-tolualdehyde, p-tolualdehyde, solicylaldehyde, cinnamaldehyde, α-naphthoaldehyde, β-naphthoaldehyde, isophthalaldehyde, terephthalaldehyde, phthalaldehyde, and 9,10-anthracenecarboxyaldehyde; aromatic dialdehydes, e.g., 9,10-anthracenedicarboxyaldehyde, 1,3-diformylazulene (produced according to a method described in Polymer Letters 2, 943 (1964); nitrogen-containing heterocyclic aldehydes, e.g. piperidine-2-aldehyde, pyridine-2-aldehyde, pyridine-3-aldehyde, pyridine-4-aldehyde, pyridine-2,6-dialdehyde, pyridine-2,4-dialdehyde, and pyridine-3,5-dialdehyde; and other known heterocyclic aldehydes including furfural, 1,1'-diformylferrocene aldehyde (produced by a method discribed in Macromolecules 1, 424 (1968) or the like.

Aminoethynyl compounds represented by the formula $H_2N—Y_1—C≡CH$ or $H_2N—Y_2—C≡CH$, which are also essential to synthesize the present inventive compounds of formulae [I] to [IV], include, for example, 3-aminoethynylbenzene, 4-aminoethynylbenzene, 4-amino-4'-ethynyldiphenyl, 4-amino-4'-ethynyldiphenylmethane, 4-amino-4'-ethynyldiphenyl ether, and propargylamine.

Aldehydeethynyl compounds represented by the formula $OHC—Y_1—C≡CH$ or $OHC—Y_2—C≡CH$ include, for example, 3-ethynylbenzaldehyde, 4-ethynylbenzaldehyde, 4-ethynyl-4'-aldehydediphenyl, 4-ethynyl-4'-aldehydediphenylmethane, 4-ethynyl-4'-aldehydediphenyl ether, and propargylaldehyde.

Aminophenol compounds represented by the formula $H_2N—Y_1—OH$ or $H_2N—Y_2—OH$, which are essential to synthesize the present inventive compounds of formulae [V] to [VIII], include, for example, o-aminophenol, m-aminophenol, p-aminophenol, also isomeric aminocresols, isomeric aminoxylenols, and a series of aliphatic aminoalcohols represented by the formula $H_2N-(CH_2)_m-OH$.

Aldehydephenol compounds represented by the formula $OHC—Y_1—OH$ or $OHC—Y_2—OH$ include, for example, 2-aldehydephenol, 3-aldehydephenol, 4-aldehydephenol, also isomeric aldehydecresols, isomeric aldehydexylenols, and a series of aliphatic aldehydealcohols represented by the formula $OHC-(CH_2)_m-OH$.

Now the eleventh aspect of the present invention is described in detail.

The 11 (a)th aspect of the invention is a process for producing a polymer having dihydropyridine rings from a compound represented by the general formula [I]:

$$HC≡C—Y_1—N=HC—X_1—CH=N—Y_1—C≡CH$$

wherein; $X_1$ is $-(CH_2)_m-$,

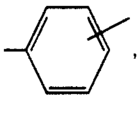, 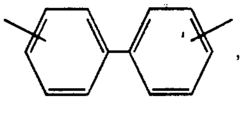,

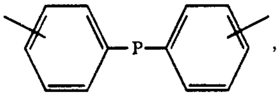, 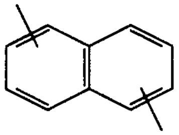,

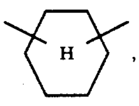, or 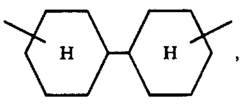,

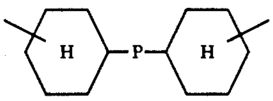

[wherein, m is an integer of 1 to 12 and P is

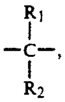,

—O—, —CO—, —S—, $—SO_2—$, or

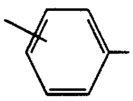

(wherein $R_1$ and $R_2$ are the same or different and denote each —H, $—CH_3$, $—C_2H_5$, $—CF_3$,

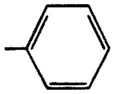, or 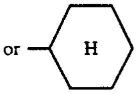)];

and $Y_1$ and $Y_2$ are the same or different divalent organic residues; which has an ethynyl group at each end of the molecule and at least two Schiff's bonds in the molecule. This process comprises heating said compound at temperatures between 120° C. and 180° C. to polymerize it through the addition of two ethynyl groups to one Schiff's bond.

The 11 (b)th aspect of the invention is a process for producing a polymer having dihydropyridine rings from a compound represented by the general formula [II]:

$$HC≡C—Y_1—CH=N—X—N=CH—Y_2—C≡CH \quad [II]$$

wherein; X is $-(CH_2)_m-$,

,

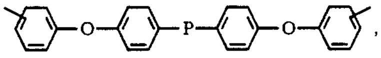,

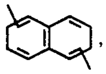, 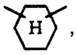, or 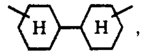,

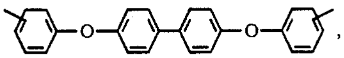,

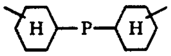

[wherein, m is an integer of 1 to 12 and P is

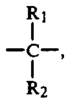,

—O—, —CO—, —S—, $—SO_2—$, or

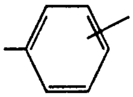

(wherein $R_1$ and $R_2$ are the same or different and denote each —H, $—CH_3$, $—C_2H_5$, $—CF_3$,

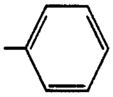, or 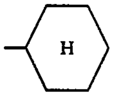)];

and $Y_1$ and $Y_2$ are the same or different divalent organic residues; which has an ethynyl group at each end of the molecule and at least two Schiff's bonds in the molecule. This process comprises heating said compound at temperatures of 120°to 180° C. to add two ethynyl groups to one Schiff's bond.

The 11 (c)th aspect of the invention is a process for producing a polymer having dihydropyridine rings from a Schiff's compound(s) represented by the general formula [III]:

$$X_3—CH═N—Y_3—C≡CH \quad [III]$$

and/or the general formula [IV]:

$$X_3—N═CH—Y_3—C≡CH \quad [IV]$$

wherein; $X_3$ is —H, $C_1$-$C_8$ alkyl,

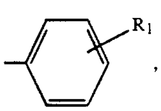, 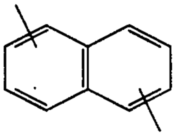, or

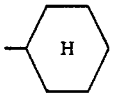, (wherein $R_1$ is —H, —F, —Cl, —Br, —$CH_3$, —$CF_3$, —OH —$NH_2$,

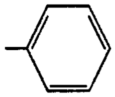, or 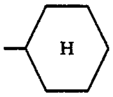); and $Y_3$ is $-(CH_2)_m-$, 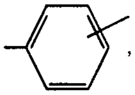,

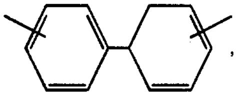,

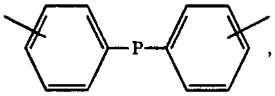,

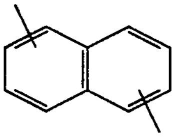, 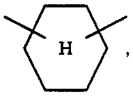, or

-continued

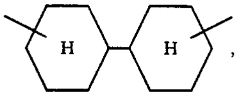,

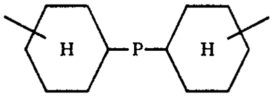

[wherein, m is an integer of 1 to 12 and P is $-(CH_2)_m-$, —O—, —CO—, —S—, —$SO_2$—,

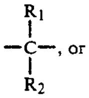, or 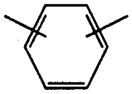

(wherein $R_1$ and $R_2$ are the same or different and denote each —H, —$CH_3$, —$C_2H_5$, —$CF_3$,

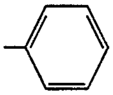, or 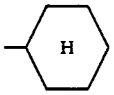)];

which has an ethynyl group at one end of the molecule. This process comprises heating said compound(s) at temperatures of 120°to 180° C. to add two ethynyl groups to one Schiff's bond.

The 11 (d)th aspect of the invention is a process for producing a polymer constituted mainly of 1,2-dihydro-1,3,5-triazine rings from a compound represented by the general formula [V]:

$$N≡C—O—Y_1—N═HC—X_1—CH═N—Y_2—O—C≡N \quad [V]$$

wherein; $X_1$ is $-(CH_2)_m-$,

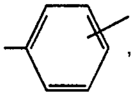, 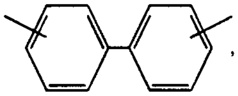,

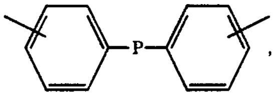,

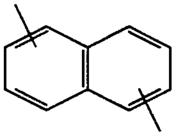, or 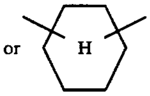

[wherein, m is an integer of 1 to 12 and P is

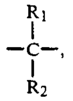,

—O—, —CO—, —S—, or —$SO_2$— (wherein $R_1$ and $R_2$ are the same or different and denote each —H, —$CH_3$, —$C_2H_5$, —$CF_3$,

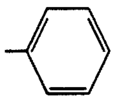 , or 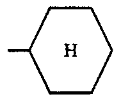 ;

which has a cyanato group at each end of the molecule and plural Schiff's bonds in the molecule. This process comprises heating said compound at temperatures of 120° to 180° C. to react it.

The 11 (e)th aspect of the invention is a process for producing a polymer constituted mainly of 1,2-dihydro-1,3,5-triazine rings from a compound represented by the general formula [VI]:

$N{\equiv}C—O—Y_1—CH{=}N—X_2—N{=}CH—Y_2—O—C{\equiv}N$ [VI]

wherein; X is $-(CH_2)_m$,

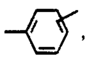 , 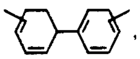 , 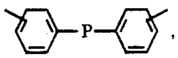 ,

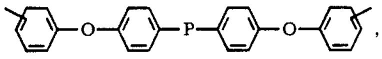 ,

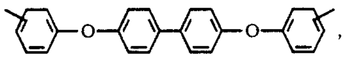 ,

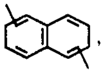 , or 

(wherein, m is an integer of 1 to 12 and P is

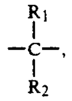 ,

—O—, —CO—, —S—, —$SO_2$— (wherein $R_1$ and $R_2$ are the same or different and denote each —H, —$CH_3$, —$C_2H_5$, —$CF_3$,

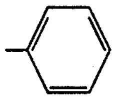 , or 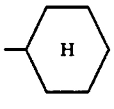 );

and $Y_1$ and $Y_2$ are the same or different divalent organic residues; which hs a cyanato group each end of the molecule and plural Schiff's bonds in the molecule. This process comprises heating said compound at temperatures of 120° to 180° C. to react it.

The 11 (f)th aspect of the invention is a process for producing a polymer constituted mainly of 1,2-dihydro-1,3,5-triazine rings from a Schiff's compound(s) represented by the general formula [VII]:

$X_3—CH{=}N—Y_3—O—C{\equiv}N$ [VII]

and/or the general formula [VIII]:

$X_3—N{=}CH—Y_3—O—C{\equiv}N$ [VIII]

wherein; $X_3$ is —H, $C_1$-$C_8$ alkyl,

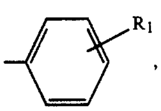 , 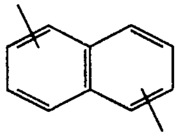 , or 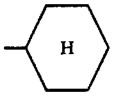

(wherein $R_1$ is —H, —F, —Cl, —Br, —$CH_3$, —$CF_3$, —OH, —$NH_2$,

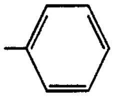 , or 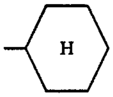 );

and $Y_3$ is $-(CH_2)_m$,

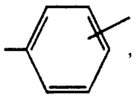 , 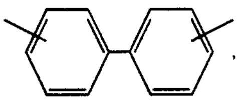 ,

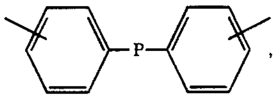 ,

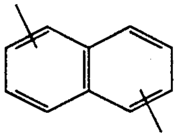 , or 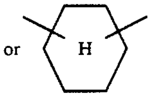

[wherein, m is an integer of 1 to 12 and P is $-(CH_2)_m$, —O—, —CO—, —S—, —$SO_2$—,

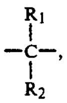 , or 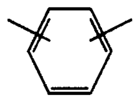

(wherein $R_1$ and $R_2$ are the same or different and denote each —H, —$CH_3$, —$C_2H_5$, —$CF_3$,

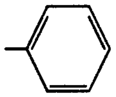 , or 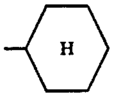 )];

which has a cyanato group at one end of the molecule. This process comprises heating said compound at temperatures of 120° to 180° C. to react it.

The following are examples of the reaction to form dihydropyridine rings.

a)
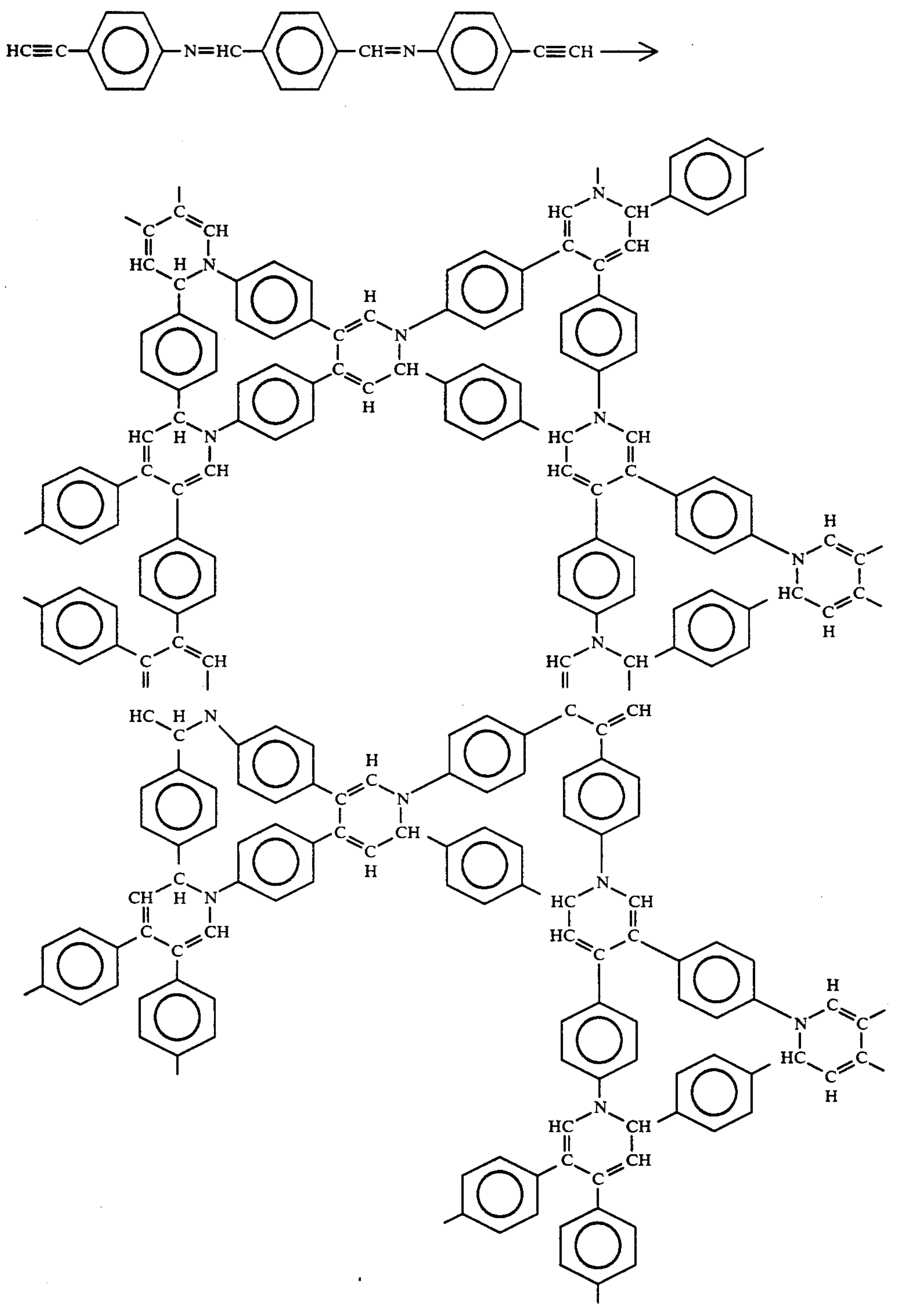
b)
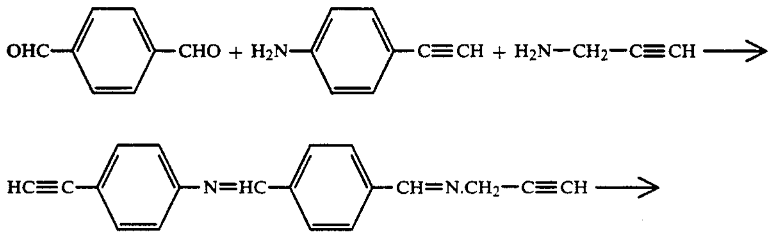

-continued
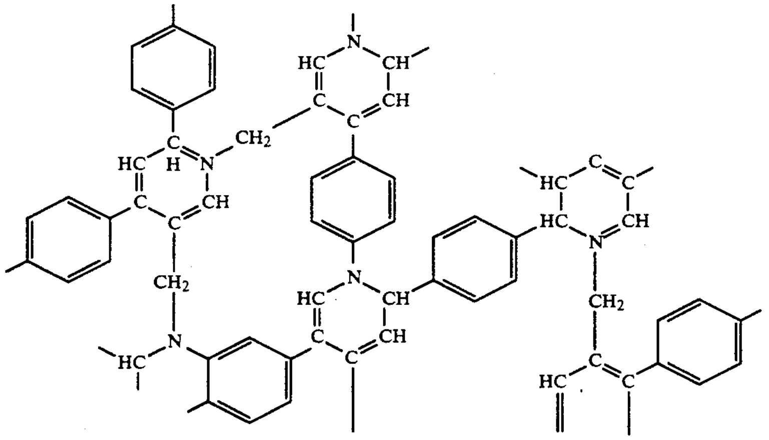
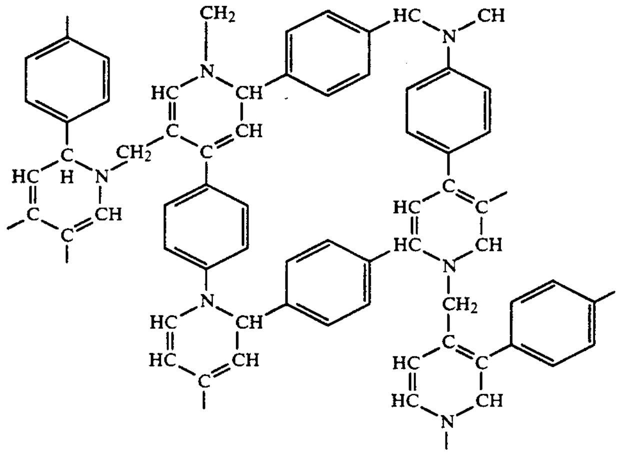
c)
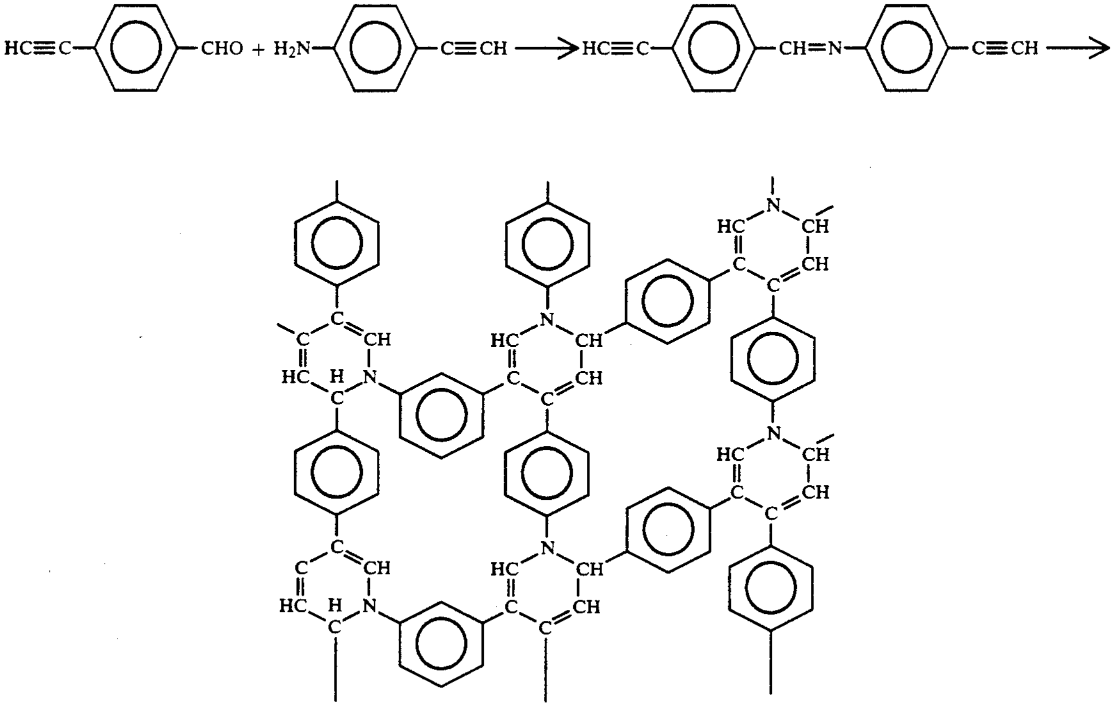

-continued
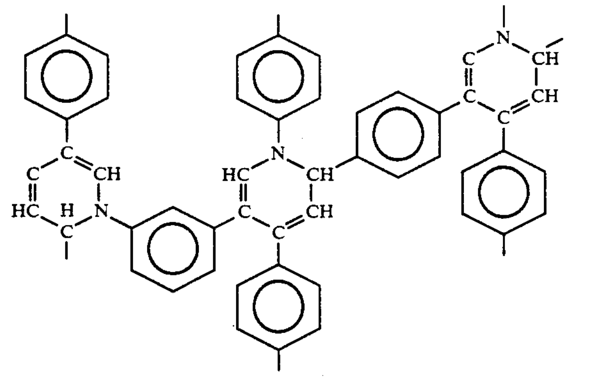
d)
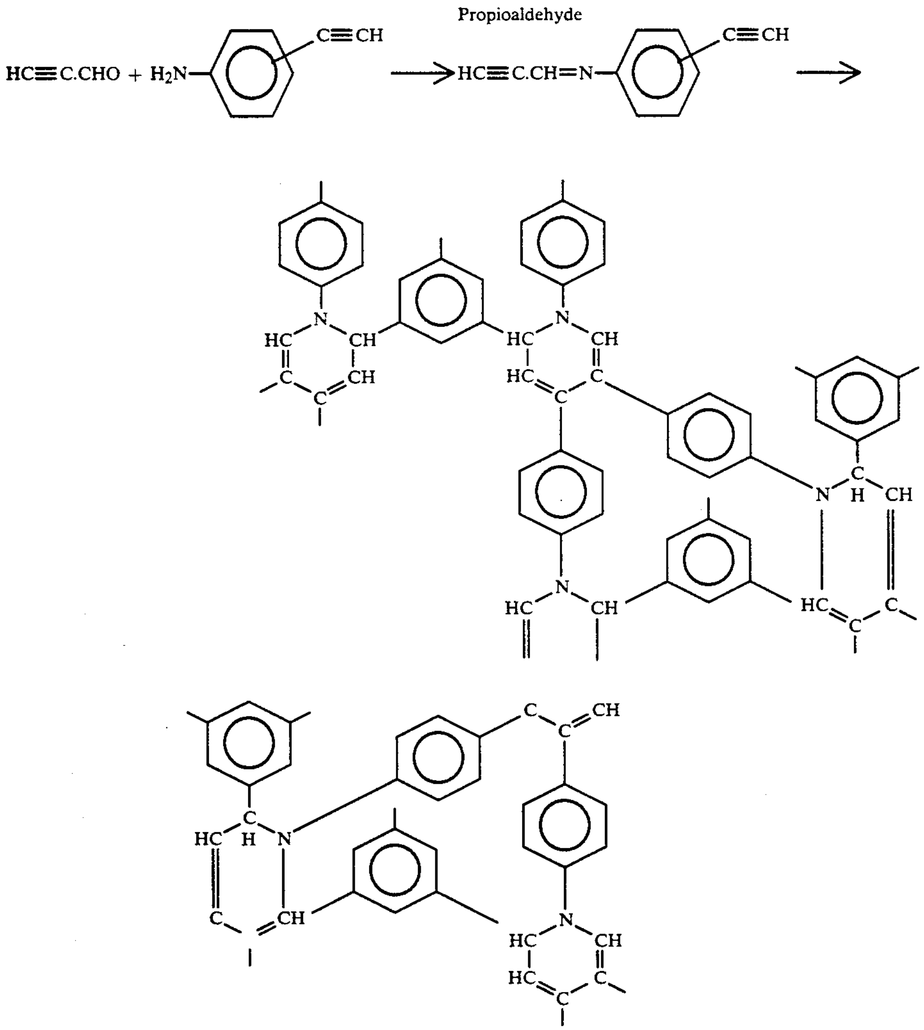
e)
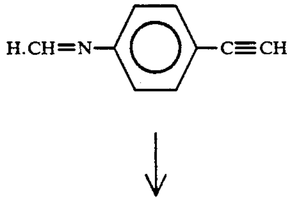

-continued
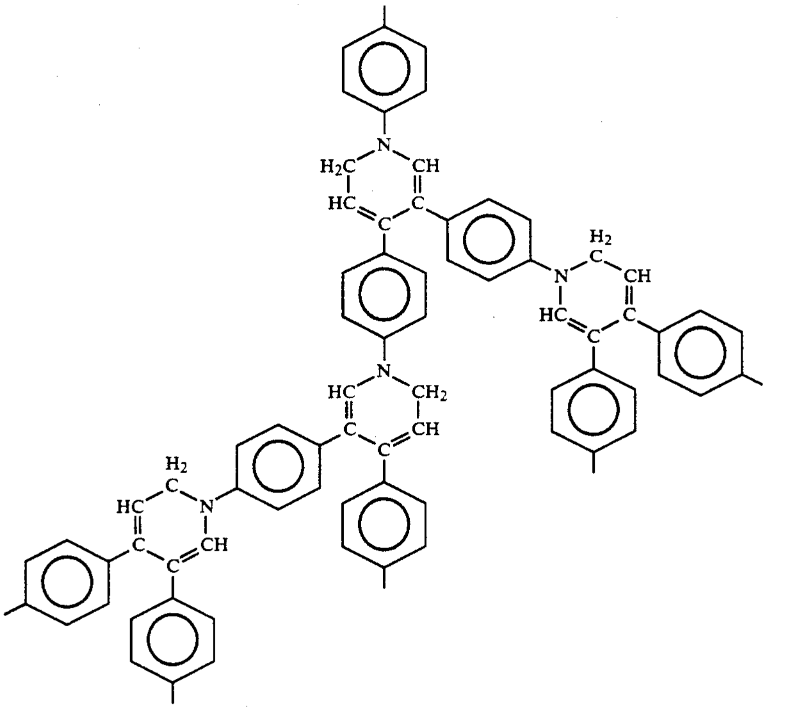
f)
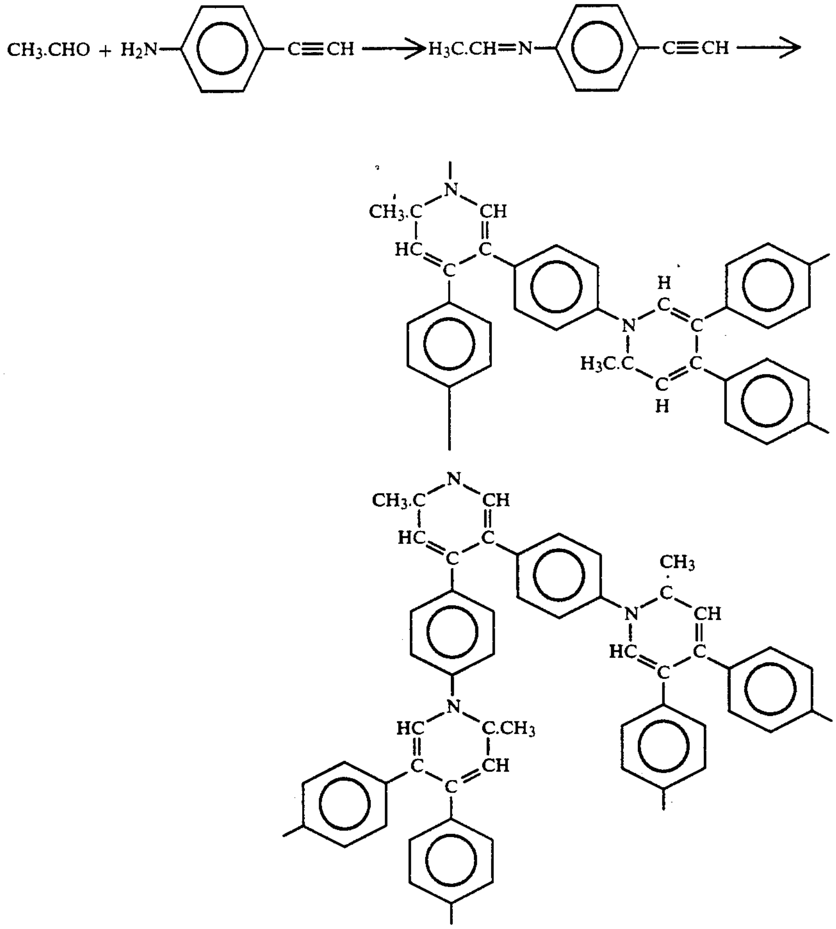

-continued
g)
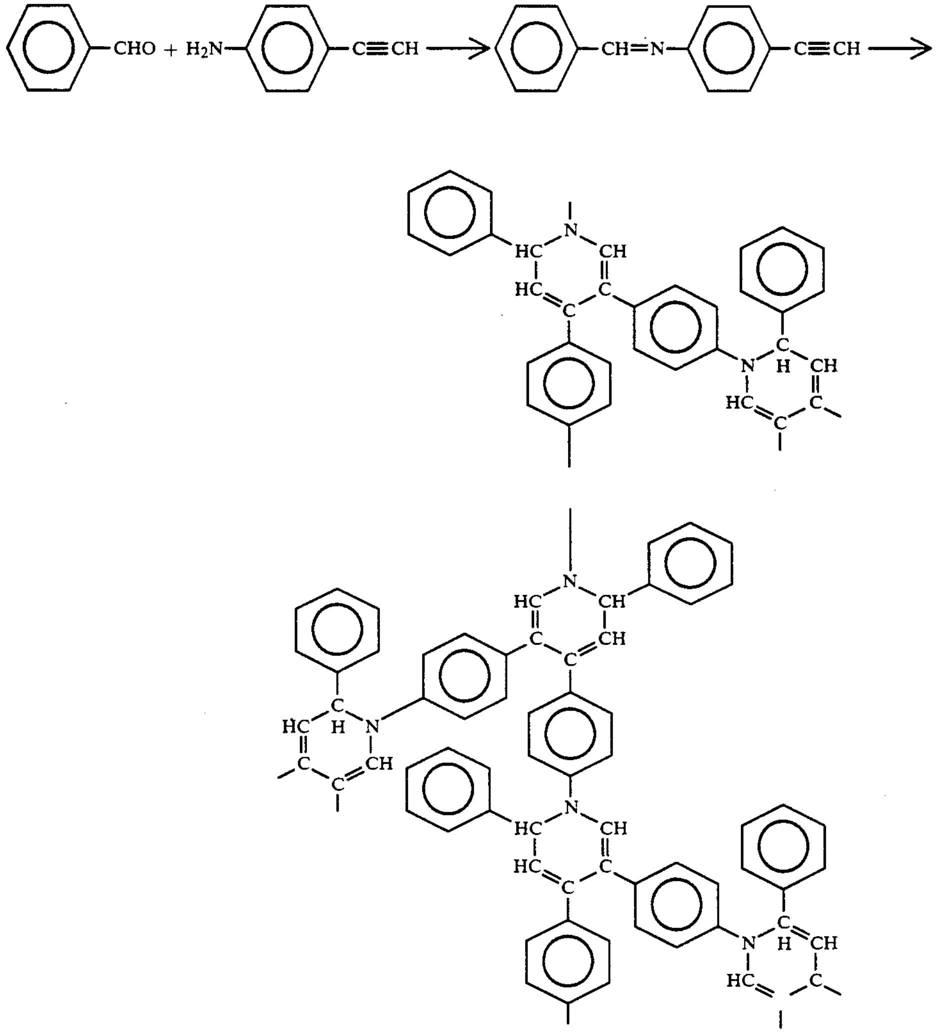
h)
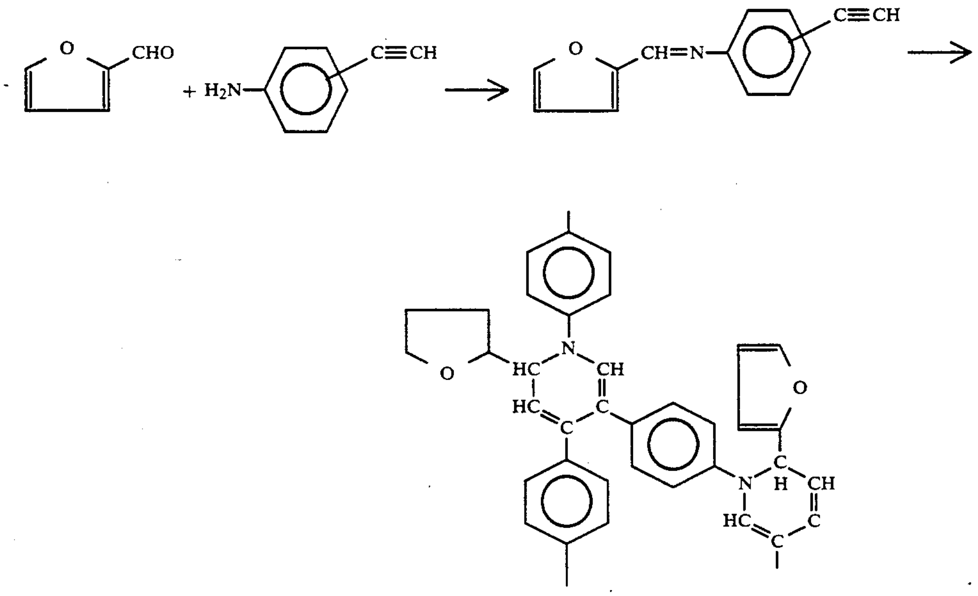

-continued
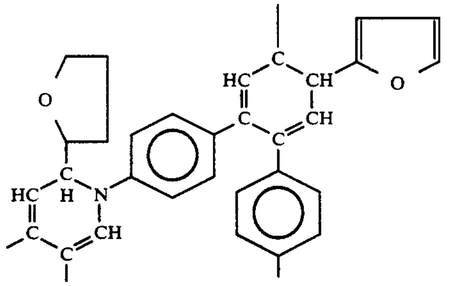
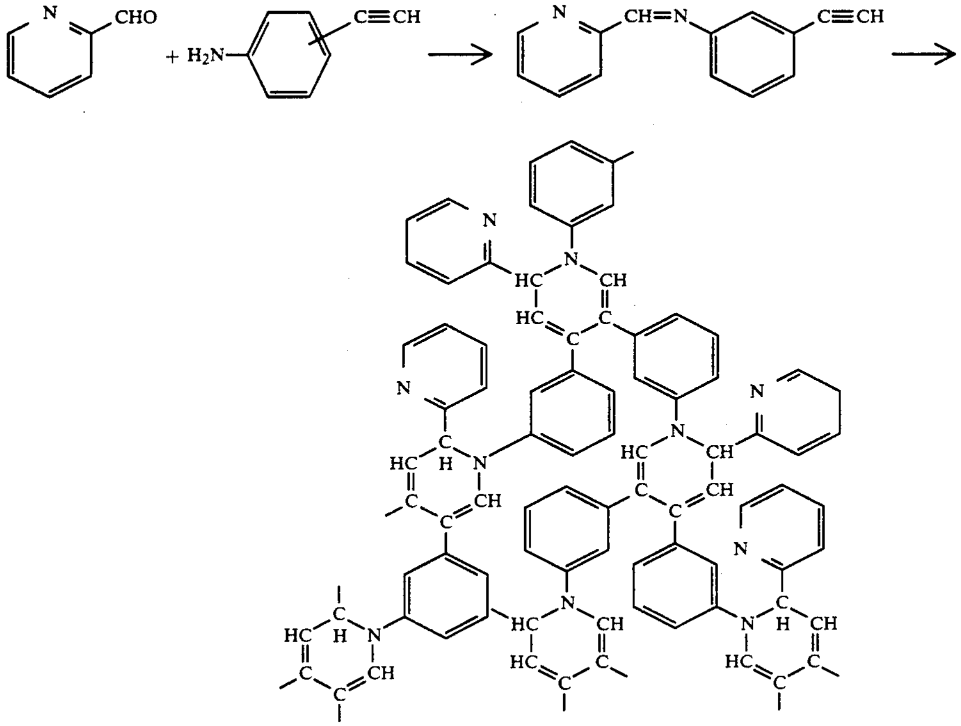
i)
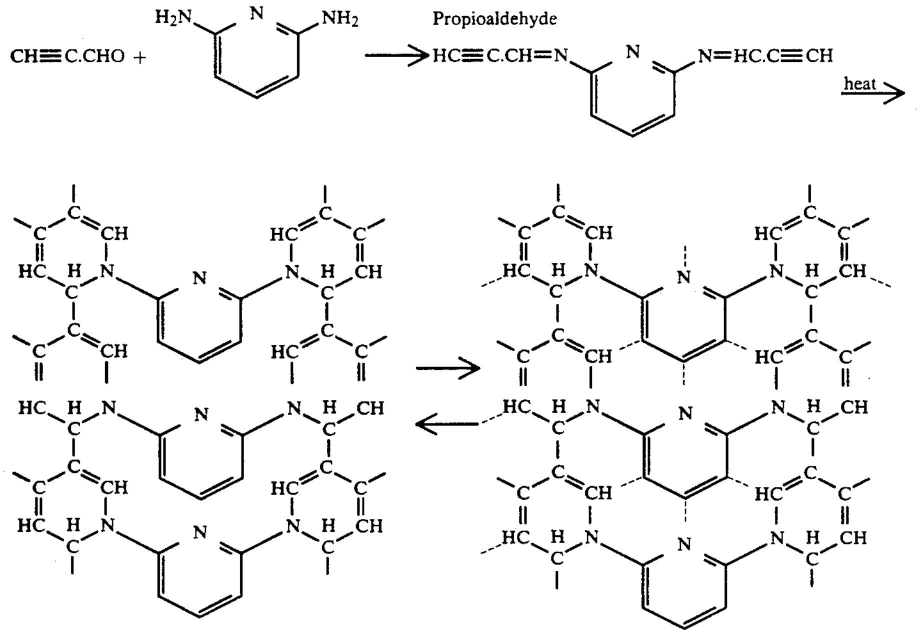

-continued k)

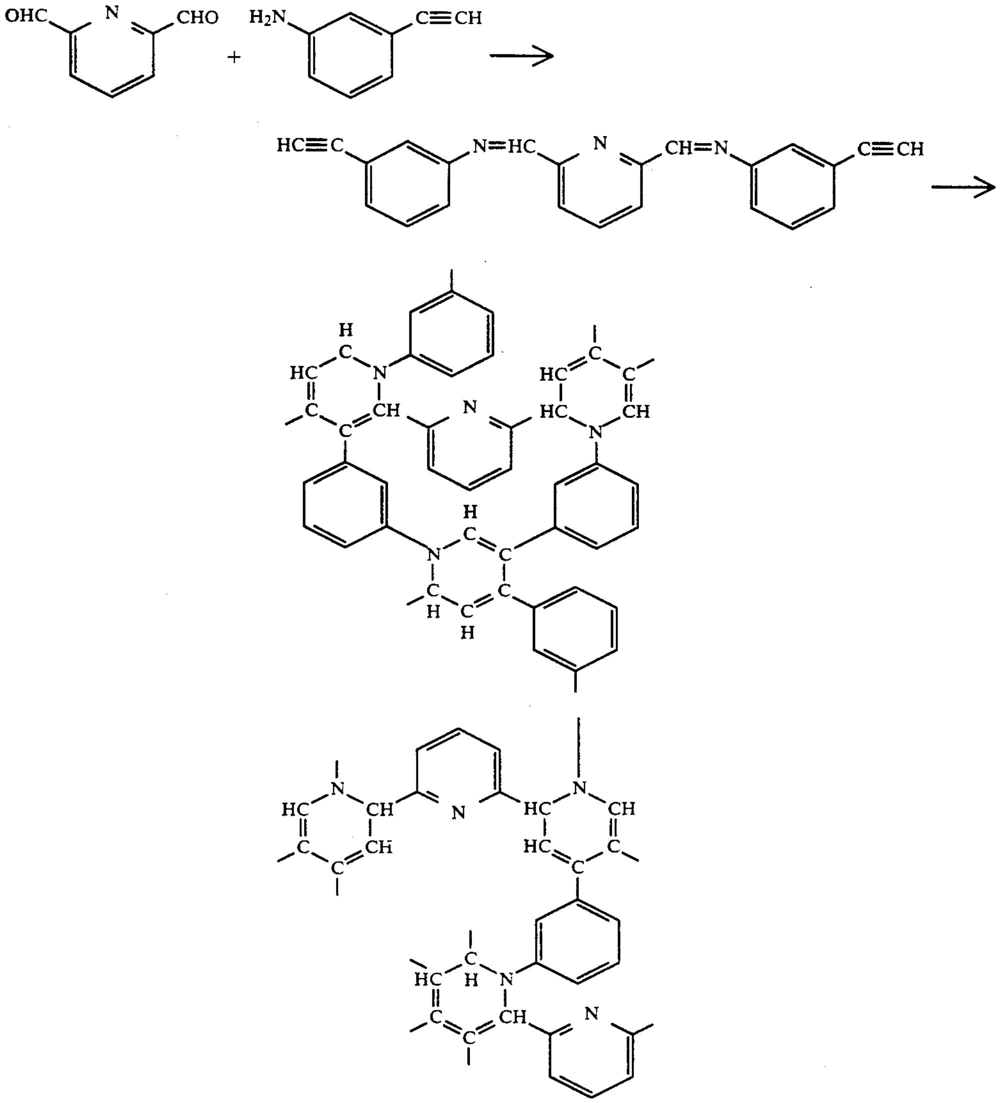

The thus produced polymers have dihydropyridine rings in the molecular skeleton. This molecular structure may account for the excellent heat resistance of these polymers. Being similar to crossed ladders in shape, such a three-dimensional structure of cured resin as shown in a)-k) above is referred to as "cross ladder structure" built up of dihydropyridine rings, in the present specification. The compounds of the general formulae [V] to [VIII] form also cross ladder structure built up of dihydrotriazine rings.

Ethynyl-terminated Schiff's compounds of general formulae [I] to [IV] or cynato-terminated Schiff's compounds of general formulae [V] to [VIII] are polymerized by applying external energy, e.g. heat or light, yielding polymers having excellent heat resistance and small coefficients of thermal expansion.

When the polymer is produced by applying thermal energy, it is desirable to control the polymerization temperature to a 10°-30° C. higher level than the melting point of the Schiff's compound used. The present inventive Schiff's compound exhibits a polymerization exothermic peak at a temperature of about 195° to about 210° C. Hence, when the polymerization is tried at temperatures of 200° C. and above, a vigorous generation of heat occurs and the intended linking state cannot be obtained. Eventually, the generated thermal energy may cause polymer or monomer bonds to split and a volume of gas to evolve. Therefore, the polymerization needs to be conducted at temperatures not exceeding 180° C. Under such temperature conditions, dihydropyridine rings are presumably formed.

In the invention, the Schiff's compound can be polymerized with a polymerizable ethylenic compound added in such an amount as not to impair the effect of the invention, for example, in an amount of 1 to 50 parts by weight based on 100 parts by weight of the Schiff's compound. Examples of such ethylenic compounds include styrene, vinyltoluene, α-methylstyrene, divinylbenzene, diallyl phthalate, diallyl phthalate prepolymer, chlorostyrene, dichlorostyrene, bromostyrene, dibromostyrene, diallyl benzene phosphonate, diallyl arylphosphonates, diallyl arylphosphinic esters, acrylic esters, methacrylic esters, triallyl cyanurate, triallyl cyanurate prepolymer, tribromophenol allyl ether, and unsaturated polyester resins. These compounds may be used alone or in combination.

The Schiff's compound can also be used in mixtures with an N,N'-substituted bismaleimide represented by the formula

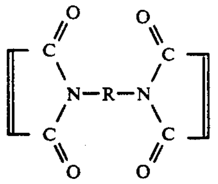

wherein R denotes alkylene, arylene, or substituted alkylene or arylene that is a divalent organic residue. Such substituted bismaleimides inlude, for example, N,N'-ethylenebismaleimide, N,N'-hexamethylenebismaleimide, N,N'-dodecamethylenebismaleimide, N,N'-m-phenylenebismaleimide, N,N'-4,4'-diphenyl ether bismaleimide, N,N'-4,4'-diphenylmethanebismaleimide, N,N'-4,4'-dicyclohexylmethanebismaleimide, N,N'-4,4'-m-xylenebismaleimide, and N,N'-4,4'-diphenylcyclohexanebismaleimide. Two or more of these bismaleimides can also be used in combination. Moreover, these bismaleimides may be used in suitable mixtures with mono-, di-, tri-, or tetra-substituted maleimides.

The present inventive Schiff's compounds and compositions containing these compounds are adaptable for molding compounds, laminating materials, paints or coating materials, adhesives, varnishes, ink compositions and toners, pastes, FRP compositions, liquid crystal compositions, and electroconductive materials, for various purposes, and moreover to nuclear reactor materials. In particular, they are useful for prepreg resins, interlaminar insulating films, for which demands are growing as LSI circuit layers are multiplied, coating materials for protecting LSI device surfaces, aligning films for liquid crystal devices, adhesives for aeronautical or space purposes, molding compounds, laminating materials, and silver pastes.

When the Schiff's compound is used for various purposes as mentioned above, various solvents may be used to solve it. Such solvents include polar organic solvents, e.g. N-methyl-2-pyrrolidone, N,N-dimethylacetamide, N,N-dimethylformamide, N,N-diethylformamide, N-methylformamide, dimethylsulfoxide, N,N-diethylacetamide, hexamethylphosphoramide, pyridine, dimethyl sulfone, tetramethyl sulfone, dimethyltetramethylene sulfone, and phenols, e.g. phenol, cresol, and xylenol. These solvents may be used alone or in combination. Non-solvents such as toluene, xylene, and petroleum naphtha may also be used in small amounts jointly with solvents mentioned above.

The present inventive Schiff's compound can be converted by heating for short time at relatively low temperatures into hardened products superior in high-temperature strength, and exhibits excellent storage stability at and near room temperature and has enough fluidity for molding under low pressure. Hence, the compound exhibits wide molding and processing latitude when used for semiconductor sealants, laminating materials, and the like.

Compositions comprising the present inventive Schiff's compound can also be used jointly with one or more of the following materials according to application purposes.

That is, when said compositions are used, for instance, as molding compounds, there may be used jointly; inorganic fillers, e.g. zircon, silica, fused quartz glass, clay, hydrated alumina, calcium carbonate, quartz glass, common glass, asbestos, whiskers, gypsum, magnesite, mica, kaolin, talc, graphite, cements, carbonyl iron, barium compounds, ferrite, lead compounds, molybdenum disulfide, zinc white, titanium white, carbon black, silica sand, and wollastonite; mold-release agents, e.g. fatty acids and waxes; coupling agents, e.g. epoxy silanes, vinylsilanes, borane compound, and alkoxy titanates; and if necessary, other known additives including flame retardants such as antimony compounds and phosphorus compounds. These additives are free to choose, of course.

In the invention, the present compound, for example, represented by any of the general formulae [I] to [VIII] is applied preferably in solution form on surfaces of semiconductor devices. Suitable solvents for these purposes include; aromatic hydrocarbons, e.g. benzene and toluene; alcohols, e.g. ethanol and 2-propanol; and ketones, chlorinated hydrocarbons, and other polar solvents, e.g. N-methylpyrrolidone.

Solutions of the above compound are applied on surfaces of semiconductor components and lead wires attached thereto. Suitable methods for the application include the immersion of a semiconductor component and lead wires in said solution, the dropwise addition of said solution onto a semiconductor component and lead wires, spray coating, and spinner coating.

The semiconductor component and lead wires coated by such a method as mentioned above are then subjected to baking treatment at a temperature of at least 100° C., preferably 120° to 200° C. The compound is polymerized and crosslinked by this treatment, forming protective coating layers. For the coatings to exhibit good effects, the thickness of coatings is desired to be up to 10 $\mu$m, particularly up to 1 $\mu$m. This can be achieved by controlling the solution to a proper concentration, which is usually up to 5% by weight.

Then, as shown in FIG. 1, an epoxy composition 6 is applied to seal the semiconductor component 2 having the protective coating 3 and the lead wires 1, thus making up a resin-sealed type of semiconductor device.

The present invention is illustrated in more detail with reference to the following examples. However, the scope of the invention is not restricted by these examples. In the examples, parts are all by weight.

EXAMPLE 1

A 1000-ml, three-necked, round-bottomed flask equipped with a stirrer was charged with 300 ml of N-methyl-2-pyrrolidone, 11.7 g (0.10 mole) of 3-aminoethynylbenzene, and 5.5 g (0.10 mole) of propargyl alcohol. Then, a solution of 13.4 g (0.1 mole) terephthalaldehyde in 200 ml of N-methyl-2-pyrrolidone was added dropwise to the mixture with stirring at room temperature. After this reaction mixture had been stirred at room temperature for about 4 hours, the reaction was further continued for 5 hours under heating at 90°-100° C. Then, the resulting mixture was added to 3000 ml of water to form a precipitate. After 24 hours' standing, the precipitate was filtered, washed, and dried at 90°-100° C. for about 3 hours, recovering the reaction product:

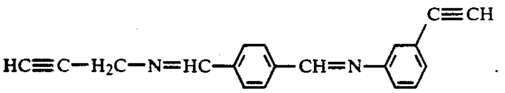

[A]

This compound [A] showed a melting point of 119° C. and an exothermic peak temperature of 203° C.

EXAMPLE 2

A 1000-ml, three-necked, round-bottomed flask equipped with a stirrer was charged with 300 ml of N-methyl-2-pyrrolidone and 23.4 g (0.20 mole) of 3-aminoethynylbenzene (APA). Then, a solution of 13.4 g (0.1 mole) terephthalaldehyde in 200 ml of N-methyl-2-pyrrolidone was added dropwise to the mixture with stirring at room temperature. After this reaction mixture had been stirred at room temperature for about 4 hours, the reaction was further continued for 5 hours under heating at 90°-100° C. Then, the resulting mixture was added to 3000 ml of water to form a precipitate. After 24 hours' standing, the precipitate was filtered, washed with pure water, and dried at 100°-110° C. for about 3 hours, recovering the reaction product:

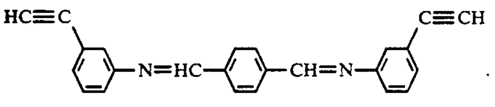

[B]

Figure 4:
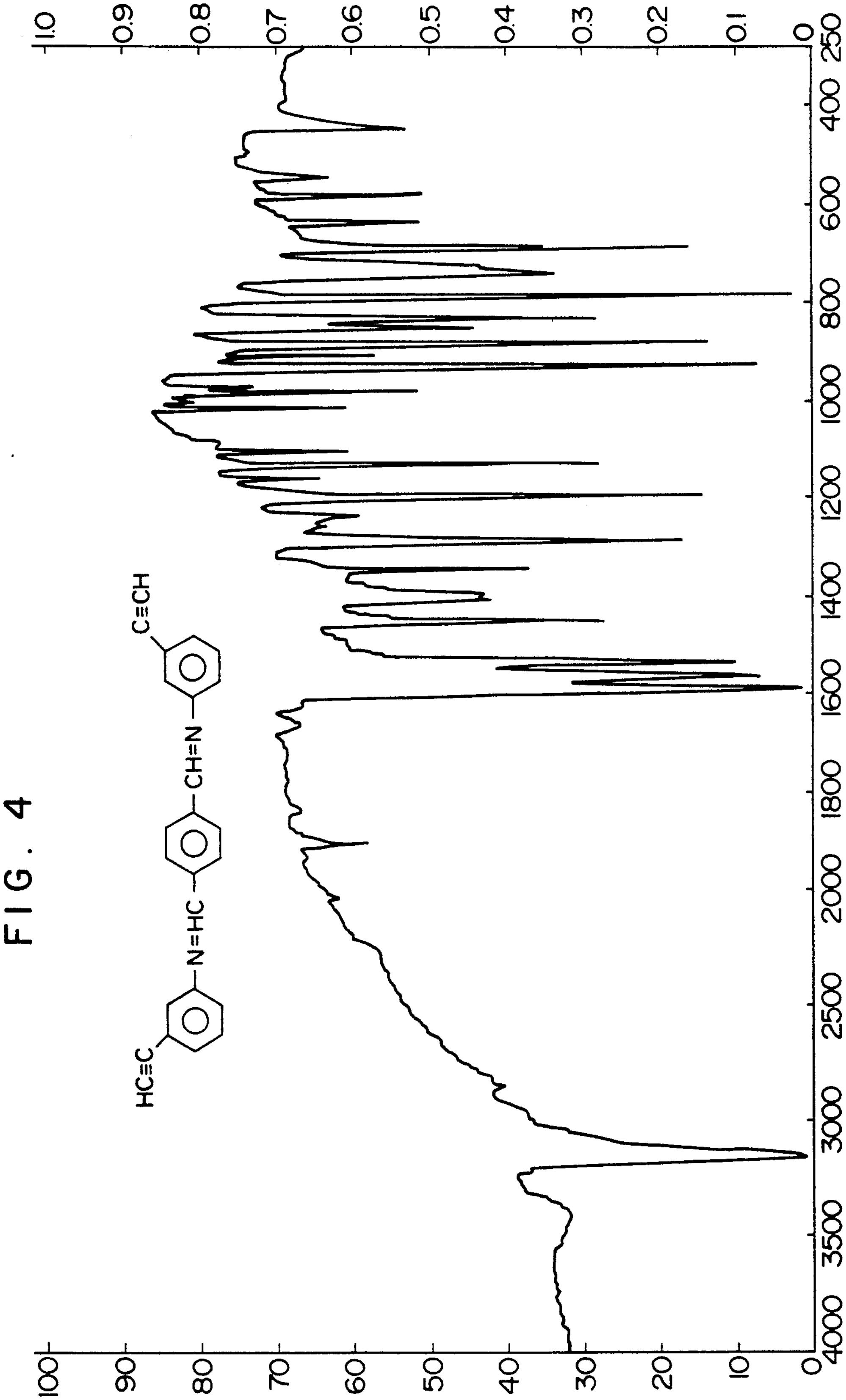
FIG. 4 shows an infrared absorption spectrum of reactant [B] (a Schiff's compound of the invention).
Figure 5:
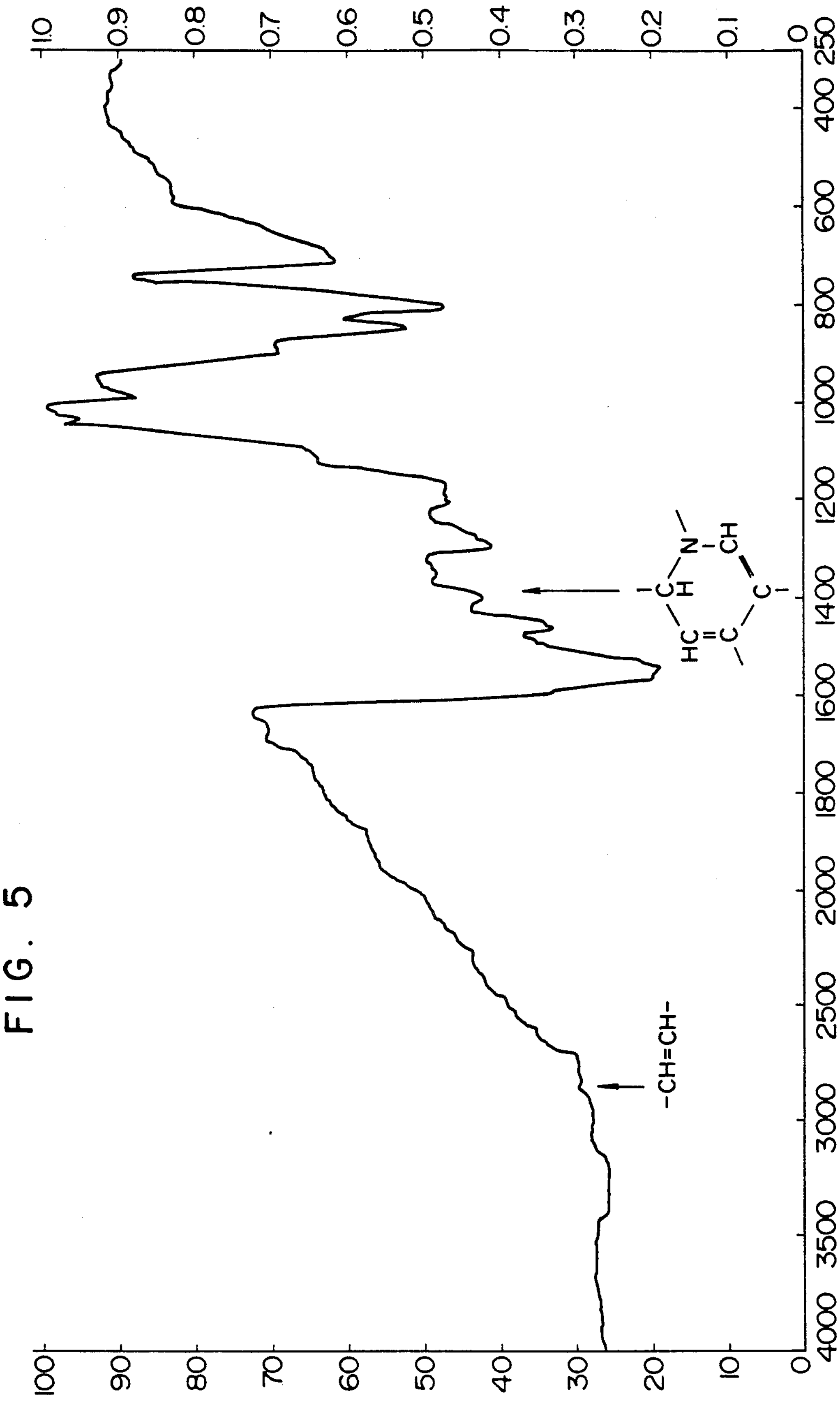
FIG. 5 shows an infrared absorption spectrum of a hardened product of reactant [B].
Figure 6:
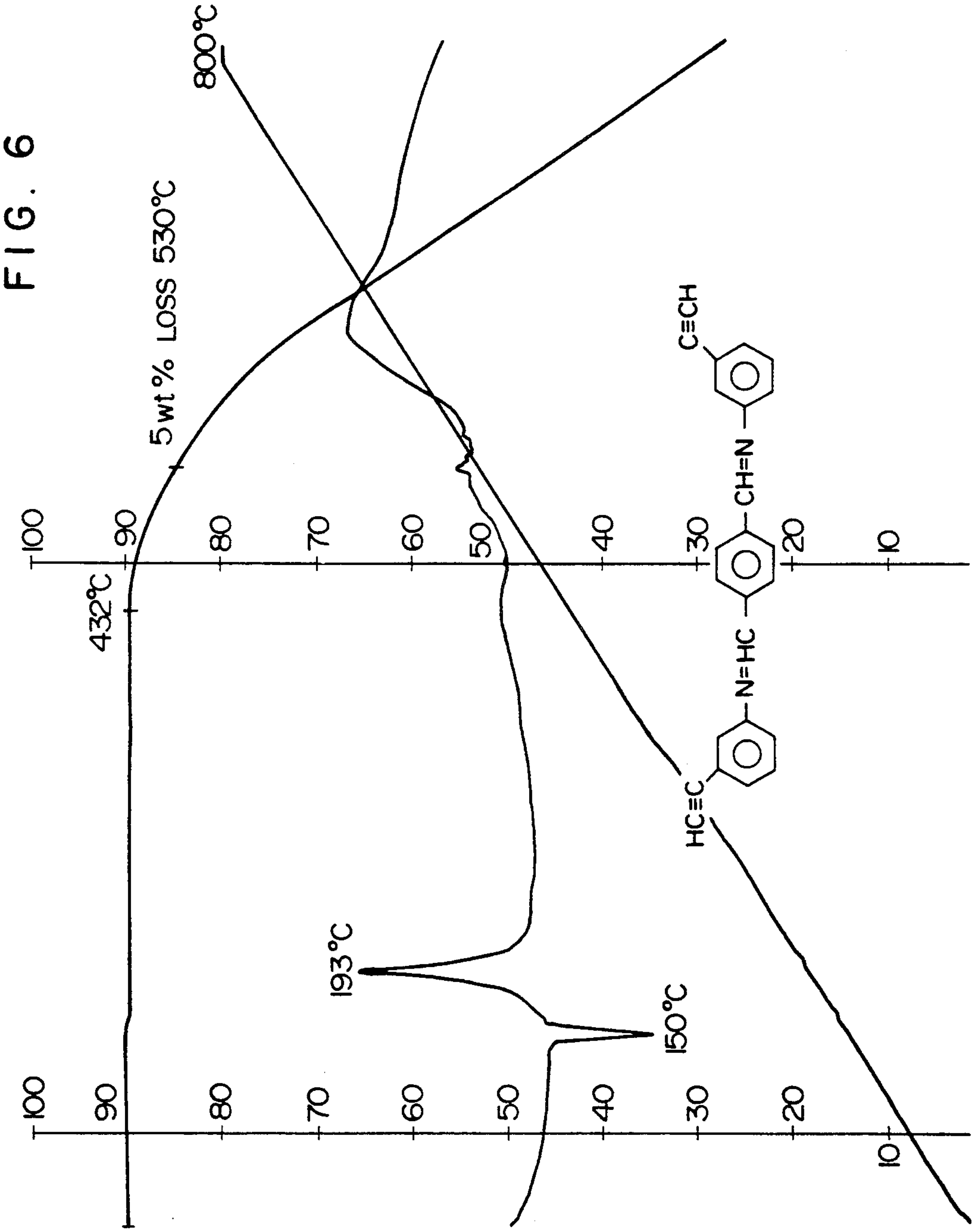
FIG. 6 shows a differential thermogravimetric curve of a hardened product of reactant [B].

This compound [B] showed a melting point of 148° C. and an ethothermic peak temperature of 199° C. An infrared absorption spectrum of this compound is shown in FIG. 4.

Table 1 shows the weight loss initiating temperatures and 5% weight loss temperatures of the ethynyl-terminated Schiff compounds [A] and [B] obtained in Examples 1 and 2, respectively, and those temperatures of an N-substituted bismaleimide (BMI) and of an ethynyl-terminated imide oligomer (MC-600):

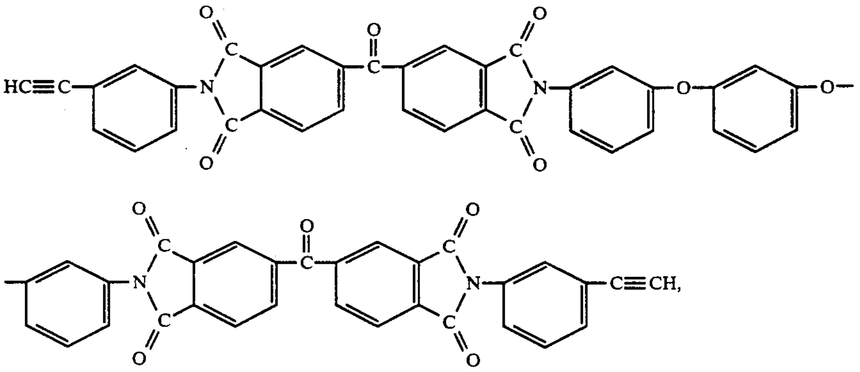

which were chosen for comparison.

TABLE 1

| | Property | | | | | |
|---|---|---|---|---|---|---|
| | | | Weight loss temperature | | | |
| Material | M.P. (°C.) | Exothermic peak (°C.) | Initiation (°C.) | 5 wt % (°C.) | Coefficient of thermal expansion $\alpha \times 10^5$ °K. | Solubility in ketones used to form varnish |
| [A] | 119 | 203 | 386 | 503 | 0.9 | ○ |
| [B] | 148 | 199 | 420 | 547 | 0.8 | ○ |
| BMI | 155 | 200 | 369 | 473 | 1.5 | X |
| MC-600 | None | None | 358 | 506 | 1.4 | X |

Note)

BMI:

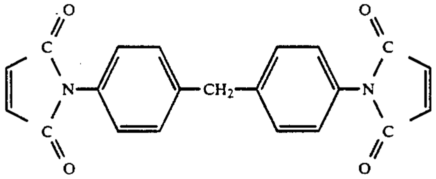

EXAMPLE 3

A 1000-ml, three-necked, round-bottomed flask equipped with a stirrer was charged with 300 ml of dimethylacetamide and 11.7 g (0.10 mole) of 3-aminoethynylbenzene. Then, a solution of 12.8 g (0.05 mole) of a dialdehyde:

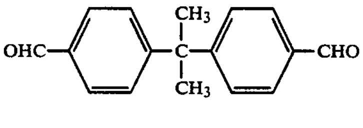

in 200 ml of dimethylacetamide was added dropwise gradually to the mixture with stirring at room temperature. After about 4 hours' reaction at room temperature, stirring of the reaction mixture was continued under heating at 90°-100° C. for 2 hours. Then, the resulting mixture was added to 3000 ml of water. The formed precipitate was filtered, washed, and dried, recovering the reaction product:

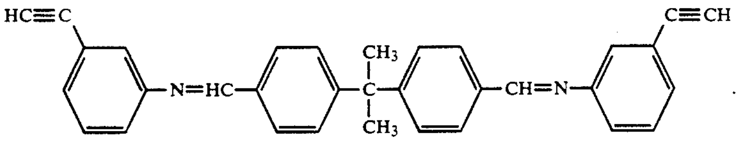
[C]
This compound [C] showed a melting point of 163° C. and an exothermic peak temperature of 201° C.
EXAMPLES 4-13
Seven species of ethynyl-terminated Schiff's compounds of the following formulae [D]-[J]:
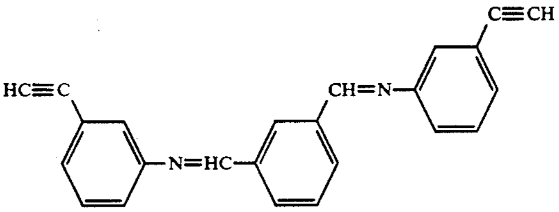
[D]
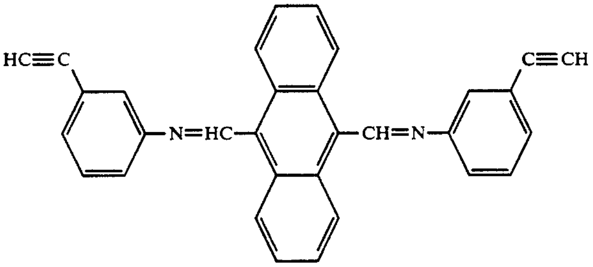
[E]
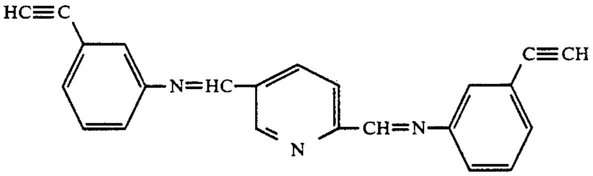
[F]
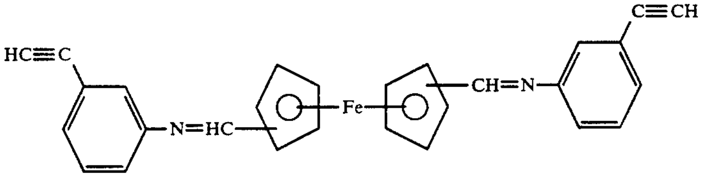
[G]
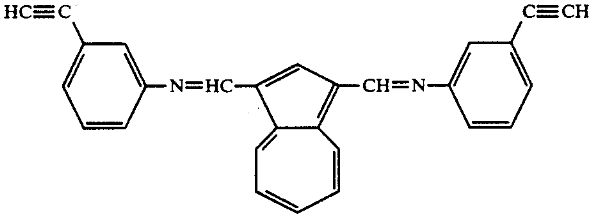
[H]
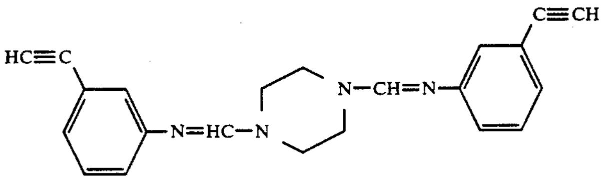
[I]

-continued

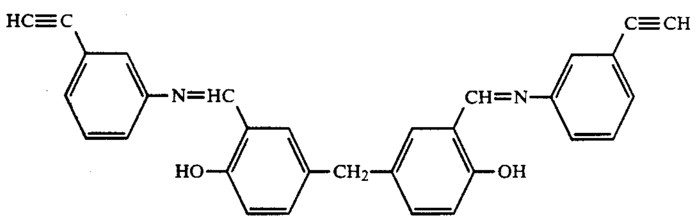

[J]

were used to prepare molding compositions. Each compound with or without a polyfunctional epoxy compound EOCN 195 (mfd. by Sumitomo Chemical Co., Ltd.), an N,N'-substituted bismaleimide:

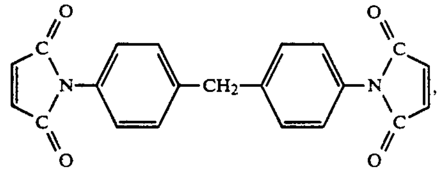

triphenyl phosphine catalyst, and dicumyl peroxide catalyst (these proportions are as shown in Table 2) was compounded with 100 parts of a powdery silica filler, 15 parts of glass fiber (chops 3 mm long), 2.0 parts of stearic acid as mold-release agent, and 1.0 part of an epoxy silane KBM 403 (mfd. by Shinetsu Chemical Co., Ltd.) as coupling agent.

Moldings for various tests were prepared from the resulting compositions by transfer molding at 170° C. applying a pressure of 100 Kgf/$cm^2$ for 30 minutes.

TABLE 2

| Composition, Property | Example 4 | 5 | 6 | 7 | 8 | 9 | 10 | 11 | 12 | 13 |
|---|---|---|---|---|---|---|---|---|---|---|
| Proportion (parts by wt.) | | | | | | | | | | |
| Ethynyl-terminated Schiff's comp'd [D] | 50 | — | — | — | — | — | — | 25 | 25 | 20 |
| Ethynyl-terminated Schiff's comp'd [E] | — | 50 | — | — | — | — | — | — | — | — |
| Ethynyl-terminated Schiff's comp'd [F] | — | — | 50 | — | — | — | — | — | — | — |
| Ethynyl-terminated Schiff's comp'd [G] | — | — | — | 50 | — | — | — | — | — | — |
| Ethynyl-terminated Schiff's comp'd [H] | — | — | — | — | 50 | — | — | — | — | — |
| Ethynyl-terminated Schiff's comp'd [I] | — | — | — | — | — | 50 | — | — | — | — |
| Ethynyl-terminated Schiff's comp'd [J] | — | — | — | — | — | — | 50 | — | — | — |
| Polyfunctional epoxy compound | — | — | — | — | — | — | — | 25 | — | 15 |
| Bismaleimide 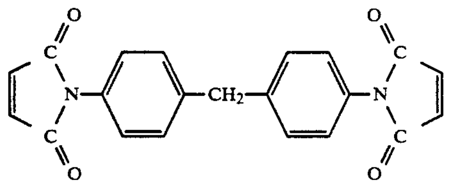 | — | — | — | — | — | — | — | — | 25 | 15 |
| Triphenyl phosphine | — | — | — | — | — | — | — | 1.0 | — | 1.0 |
| Dicumyl peroxide | — | — | — | — | — | — | — | — | 1.0 | — |
| Property | | | | | | | | | | |
| Flexural strength (Kg/$mm^2$) at 250° C. | 15.7 | 15.5 | 15.5 | 14.9 | 15.0 | 14.3 | 15.8 | 16.0 | 16.2 | 16.2 |
| Weight loss (%) on heating in the air, 5° C./min, up to 500° C. | 1.3 | 1.5 | 1.5 | 1.5 | 1.4 | 2.0 | 1.0 | 2.5 | 1.2 | 1.8 |

EXAMPLE 14

An ethynyl-terminated Schiff's compound of the formula HC≡C

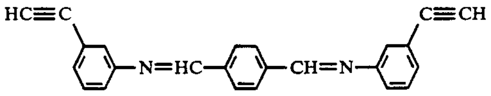

was dissolved in a 50:50 (by weight) N-methyl-2-pyrrolidone-MEK mixture to prepare 1000 ml of a 8% varnish. A glass fabric (WF-230, mfd. by Nitto-bo Co., Ltd.) was immersed in the varnish, and this varnish-impregnated sheet was dried by heating at 100°-120° C. for about 3 hours, giving a prepreg. The resin content of this prepreg was 46 wt %.

Six sheets of the prepreg were superposed together and compression-molded at 150°-160° C. and 50 Kg·f/$cm^2$ for 2 hours. The molded laminate exhibited a tensile strength of 15.6 Kg/$cm^2$ at 100° C. (ASTM D-638), flexural strength of 14.1 Kg/$cm^2$ at 100° C. (ASTM D-790), and Izod impact strength (notched) of 5.9 Kg·cm/cm at 25° C. (ASTM D-256).

EXAMPLE 15

A 45% resin composition-containing varnish was prepared by dissolving 100 parts of a bisphenol A type epoxy resin (EP.1001, mfd. by Shell Chemical Co.) and 100 parts of an ethynyl-terminated Schiff's compound:

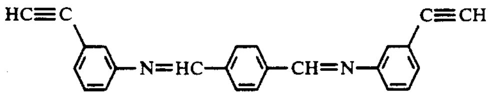

in a 50:50 (by weight) MEK-dimethylformamide mixture.

A glass fabric (treated with epoxy silane KBM 303) 0.1 mm thick was impregnated with said varnish and then dried at 110° C. for 7 minutes by using a coating-drying apparatus, giving a B-stage prepreg of 40 wt % resin content.

Ten sheets of this prepreg were superposed together, and a 35-$\mu$m thick electrolytic copper foil was applied on each side of the whole sheet. The whole layer, sandwiched between two stainless steel plates, was hot-pressed at 155° C. and 40 $Kg/cm^2$ for 2 hours, providing a double-wall copper-clad laminate board.

Properties of this copper-clad laminate board are shown in Table 3.

TABLE 3

| | |
|---|---|
| Flexural strength (at 180° C.) | 51 $kg/mm^2$ |
| Volume resistivity | $6 \times 10^{15}$ Ω · cm |
| Coefficient of thermal expansion | $1.7 \times 10^{-5}$ °$K.^{-1}$ |
| Peel strength in the direction of 90° (at 180° C.) | 1.9 kg/cm |
| Soldering heat resistance, 280° C., 60 sec. | No blister developed |

EXAMPLE 16

A 90:10 copper-tin alloy powder (passed through a 32- mesh sieve) was scattered onto a 1-mm thick steel strap, and sintered in a reducing atmosphere at 800°-380° C. for 40 minutes, forming a porous layer 350 $\mu$m thick.

After sintering, the porous layer was cooled to room temperature, and thereon was scattered a powdery mixture of 35 wt % of graphite, 15 wt % of PTFE, and 50 wt % of an ethynyl-terminated Schiff's compound:

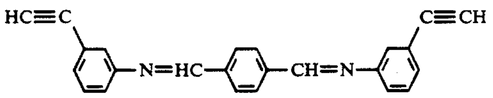

This layer of powder was prelimarily shaped by pressing with a first 100 $Kg/cm^2$ pressure roller and with a second 200 $Kg/cm^2$ pressure roller, at 160° C. for 1 hour, and further shaped by pressing with a third 300 $Kg/cm^2$ pressure roller and with a fourth 400 $Kg/cm^2$ pressure roller, at an oven temperature of 250° C., thus forming a coating about 450 $\mu$m thick.

The thus obtained slippery flat plate was subjected to a thrust load test under the following conditions, exhibiting small coefficients (0.05-0.03) of friction and superior load resistance.

| Test conditions | |
|---|---|
| Sliding speed: | V = 278 m/min |
| Load: | P = 10 $Kg/cm^2$ added every 10 minutes, cumulative load 450 $Kg/cm^2$. |
| Material to slide: | S45C, lubricated and not lubricated at all. |

EXAMPLE 17

An ethynyl-terminated Schiff's compound:

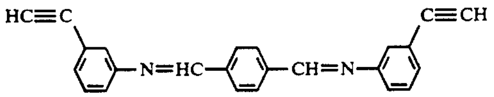

was dissolved in dimethylformamide to prepare a solution of 2 wt % concentration. This solution was applied uniformly by operating a spinner coater at 3500 rpm on a thoroughly-washed transparent conductive film supported by a polyethylene terephthalate film. The applied solution was dried by heating at 120° C. for 15 minute to evaporate the dimethylformamide and form a 650-Å thick film, which was then rubbed with felt in a definite direction, thus preparing a substrate film having a molecular orientation controlling film.

Two films prepared in this way were arranged with the orientation controlling films facing each other, and were bonded together by using a polyester-based sealant, forming a liquid crystal display device. A liquid crystal of the phenylcyclohexane family (ZLI-1132, mfd. by Merck Co.) was filled in the space between the orientation controlling films, and the orientation state of the liquid crystal was examined by inserting the device between two crossed polarizing plates, where the liquid crystal showed a good orientation state (till angle 2.3 degree).

EXAMPLE 18

A powder coating material was prepared by milling 50 parts of a bisphenol A type epoxy resin (epoxy equivalent weight 475), 2.5 parts of an ethynyl-terminated Schiff's compound [B], 2.5 parts of N,N'-4,4'-diphenymethanebismaleimide, 2.0 parts of triphenyl phosphine, and 1.0 part of silica aerogel at 80°-110° C. for 10 minutes over mixing rolls, and pulverizing the milled mixture finely in a grinder to particle sizes passable through a 125-mesh sieve.

The obtained coating material, after three months' standing at room temperature, retains good flow properties for coating and the resulting coat also shows prominent appearance. In addition, the adhesive strength of this coating material to steel sheets is as high as 560 $Kg/cm^2$ after 30 days' standing at 150° C. The resulting coat (130-150 $\mu$m thick) exhibits a pencil hardness of 4H, Erichsen test value of 3.9 (½ inch), and Du Pont impact value of 5.5 (1 Kg-½ inch).

EXAMPLES 19 and 20

An ethynyl-terminated Schiff's compound [B] was cured by heating at 160°-170° C. for 1 hour and then at 200° C. for 2 hours, and the cured compound was finely pulverized in a grinder to an average particle diameter of 44 $\mu$m, yielding a fine powder ($P_1$) for filler use.

On the other hand, the same Schiff's compound [B] was cured by heating at 160°-170° C. for 1 hour and at 200° C. for 2 hours and further at 500°-550° C. for 1 hour, and the cured compound was finely pulverized in a grinder to an average particle diameter of 44 $\mu$m, yielding a fine powder ($P_2$) for filler use.

These two fillers were used to prepare molding compounds based on an epoxy resin.

That is, two blends were prepared by intermixing 100 parts of a polyfunctional epoxy compound (EOCN 195, epoxy equivalent weight 195, mfd. by Sumitomo Chemical Co., Ltd.), 55 parts of a novolac type phenol resin (HP607N, mfd. Hitachi Kasei Co., Ltd.), 2.0 parts of triphenyl phosphine as hardening accelerator, 1.5 parts of an epoxy silane (KBM 303, mfd. by Shinetsu Chemical Co., Ltd.) as coupling agent, 2 parts of carbon black (mfd. by Cabot Corp.) as colorant, and 480 parts each of the above fine powders [$P_1$] and [$P_2$]. Then, each blend was milled on a pair of 8-inch $\phi$ rolls heated at 75°–85° C., and was cooled and coarsely ground. Thus, two molding resin compositions were obtained.

Cured resin specimens for various tests were formed from these resin compositions by using a transfer molding machine under the molding conditions of 180° C.$\times$70 Kgf/cm$^2$ $\times$2 minutes. Properties of the cured specimens are shown in Table 4.

TABLE 4

| Item | Example 19 | Example 20 |
|---|---|---|
| Fine powder [$P_1$] | 480 | — |
| Fine powder [$P_2$] | — | 480 |
| Flexural strength (Kg/cm$^2$) at 180° C. | 235 | 277 |
| Flexural strength (Kg/cm$^2$) at 180° C. after 30 days' standing at 180° C. | 210 | 265 |
| Volume resistivity (Ω) at 120° C. | $2.1 \times 10^{15}$ | $1.1 \times 10^3$ |

EXAMPLE 21

The compound represented by the general formula [V] is applied preferably in solution form on the surface of semiconductor devices. Suitable solvents for these purposes include; aromatic hydrocarbons, e.g. benzene and toluene; alcohols, e.g. ethanol and 2-propanol; and ketones, chlorinated hydrocarbons, and other polar solvents, e.g. N-methylpyrrolidone. These solvents are preferably used in combination.

Solutions of the above compound are applied on surfaces semiconductor components and lead wires attached thereto. Suitable methods for the application include the immersion of semiconductor components and lead wires in said solution, the addition thereof dropwise onto semiconductor components and lead wires, spray coating, and spinner coating.

The semiconductor component and lead wires coated by such a method as mentioned above are then subjected to baking treatment at a temperature of at least 100° C., preferably 120° to 200° C. The compound is polymerized and crosslinked by this treatment, forming protective coating layers. For the coating layers to exhibit good effects, the thickness thereof is desired to be up to 10 μm, particularly up to 1·μm. This can be achieved by controlling the solution to a proper concentration, which is usually up to 5% by weight.

Then, as shown in FIG. 1, the following epoxy resin composition is applied to seal the component 2 having the protective coating layer 3 and lead wires 1, thus making up a semiconductor device.

| Sealing epoxy resin composition: | |
|---|---|
| Novolac type epoxy resin | 100 parts |
| Phenol-Formaldehyde resin | 55 parts |
| Catalyst of imidazole family | 3 parts |
| Fused quartz powder | 480 parts |
| Epoxy silane | 2 parts |
| Hoechst wax | 2 parts |
| Carbon black | 1 part |

A blend having the above composition was milled for 10 minutes on a pair of rolls heated at 70°–80° C., and was coarsely ground to prepare a sealing resin composition.

Semiconductors sealed with said resin composition (50 sets) were placed in an oven oversaturated with steam (a pressure cooker) whose pressure was kept 2 atoms. at a temperature of 121° C. for 2500 hours. Thereafter the presence of the disconnection of semiconductors was examined and no disconnected semiconductor was found.

Semiconductor components having said protective coatings can be sealed by using cans, solder-fused ceramics, or glass-fused ceramics, besides using sealing resins.

EXAMPLE 22

Figure 2:
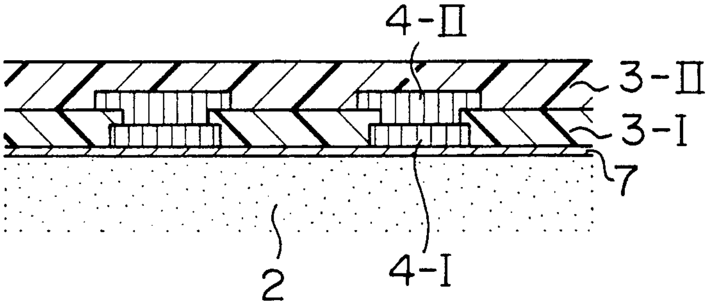
FIGS. 2 and 3 are cross-sectional views of body portions of semiconductor devices pertaining to the invention.

A solution of 1 wt % concentration was prepared by dissolving compound [B] used in Example 2 in a 50:50 (by weight) toluene-N-methylpyrrolidone mixture. FIGS. 1 and 2 show each the structure of a semiconductor device provided with multilayer (double layer) circuit insulating films formed by using this solution.

The device was constructed as follows: An Si substrate was overlaid in turn with an insulating $SiO_2$ layer and with a poly silicon layer, and a first aluminum wiring (2-I) was formed thereon. A portion of the above resin solution was applied (using a spinner coater) on the wiring, and dried and baked (250° C. for 60 minutes) to form a first insulating film (3-I). Then, a positive resist composition was applied, and the thoroughhole patterning was carried out. Thereafter, plasma etching was conducted by using $CF_4$-$O_2$ as reactant gas and further using $O_2$ as reactant gas, thereby removing the positive resist.

In the next place, a second aluminum wiring (2-II) was formed, and a portion of the resin solution was further applied, and baked (under the same conditions as mentioned above) to form a second insulating film (3-II).

FIG. 2 shows the structure of a semiconductor device (4 layers) wherein the second insulating film was formed from a polyimide resin (PIQ, mfd. by Hitachi Kasei Co., Ltd.).

The semiconductor device thus prepared according to the present invention was packaged by using an epoxy resin molding compound with a phenol novolac hardener, thereby preparing an LSI for memory use (1 Mbit D-RAM memory). After this LSI had been allowed to stand in an atmosphere of 85° C. and 85% R. H. for 2000 hours while applying a bias, no wire break failure due to Al wire corrosion occurred therein. Thus, the LSI was found to be excellent in moisture resistance.

EXAMPLE 23

An adhesive was prepared by mixing a solution (a) of 20 parts of an ethynyl-terminated Schiff's compound of the formula

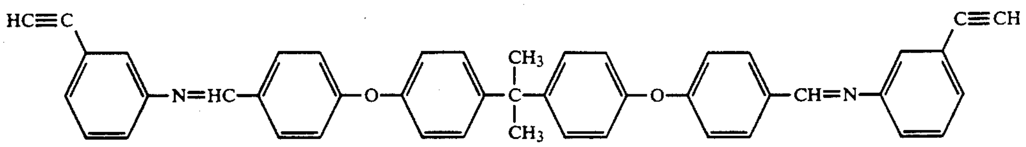

in 20 parts of dimethylacetamide with a solution (b) of 20 parts of a polyvinyl butyral resin in 200 parts of a 50:50 (by weight) MEK-n-butanol mixture.

Then, the above adhesive was applied on a copper foil to a thickness of 30 μm, and dried at 105°-120° C. for 20 minutes, giving an adhesive coated copper foil. This foil was superposed on a base material which was formed by laminating several sheets impregnated with an epoxy resin, and the whole layer was pressed under heating to prepare a copper-clad laminate board. The adhesive strength (peel strength) of this board was measured in accordance with JIS C6481. Results of the measurement were as shown in Table 5.

TABLE 5

| Adhesive strength (Peel strength) | $kg/cm^2$ |
|---|---|
| Room temp. (at 25° C.) | 2.1 |
| 100° C. | 2.0 |
| 150° C. | 1.8 |

EXAMPLE 24

An adhesive was prepared by mixing a solution (c) of

EXAMPLE 25

A 1000-ml, three-necked, round-bottomed flask equipped with a stirrer was charged with 300 ml of N-methyl-2-pyrrolidone (NMP) and 18.6 parts of p-aminophenol. Then, a solution of 13.4 parts of terephthalaldehyde in 200 ml of NMP was added dropwise to the mixture with stirring at room temperature. This reaction mixture was stirred at room temperature for 4 hours and further at 90°-100° C. for 5 hours, giving a reaction product:

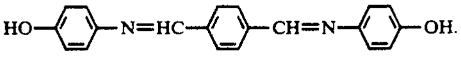

To the reaction product solution cooled were added a 10% NMP solution containing 21.2 parts of Br-C≡N and 0.8 part of triethylamine and the reaction was carried out at 70°-100° C. for 4 hours. Then, the resulting mixture was added to 3000 ml of water to form a precipitate. After 24 hours' standing, the precipitate was filtered, washed, and dried, yielding 35.8 parts of the intended product (A'):

(A')

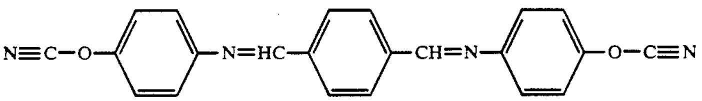

20 parts of the ethynyl-terminated Schiff's compound [B] prepared in Example 2 in 30 parts of a 50:50 (by weight) dimethylacetamide-toluene mixture with a solution (d) of 20 parts of a phenoxy resin (PKHH, mfd. by Union Carbide Corp.) in 350 parts of a 50:50 (by weight) ethyl Cellosolve-toluene mixture, and further adding 3 parts of dicyandiamide.

Then, a copper-clad laminate board was prepared according to the procedure of Example 23 by using this adhesive, and the adhesive strength (peel strength) of the copper foil to the laminate was measured. Results of the measurement were as shown in Table 6.

TABLE 6

| Adhesive strength (Peel strength) | $kg/cm^2$ |
|---|---|
| Room temp. (at 25° C.) | 2.0 |
| 100° C. | 2.0 |
| 150° C. | 2.0 |
| 200° C. | 1.8 |

EXAMPLE 26

A 1000-ml, three-necked, round-bottomed flask equipped with a stirrer was charged with 300 ml of NMP 21.6 parts of p-aminobenzcyanate. Then, a solution of 13.4 g (0.1 mole) of isophthalaldehyde in 200 ml of NMP was added dropwise to the mixture with stirring at room temperature. This reaction mixture was stirred at room temperature for 4 hours and further at 90°-100° C. for 5 hours. Then, the resulting mixture was added to 3000 ml of water to form a precipitate. After 24 hours' standing, the precipitate was filtered, washed with pure water, and dried at 100°-110° C. for about 3 hours, yielding the intended product:

(B')

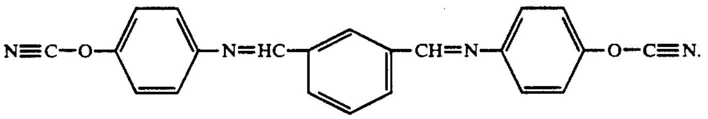

Table 7 shows the weight-loss initiation tempe temperatures and 5% weight-loss temperatures of the cyanato-terminated Schiff's compounds (A') and (B') prepared in Examples 25 and 26, respectively, and those of an N-substituted bismaleimide (BMI) and of an ethynyl-terminated imide oligomer MC-600:

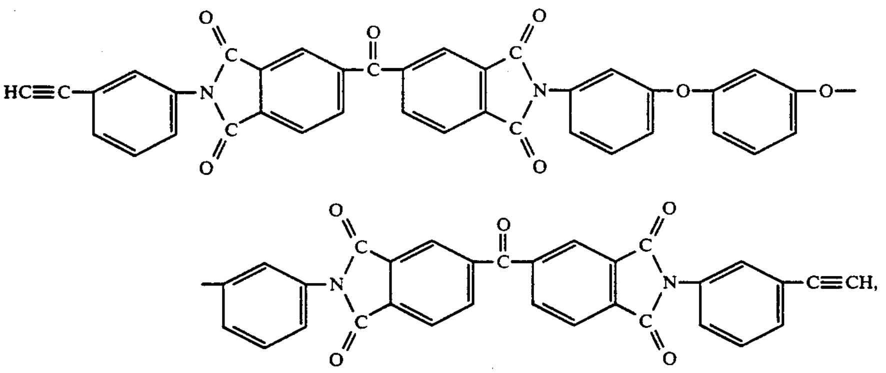

and the coefficients of thermal expansion of hardened products of these four compounds.

TABLE 7

| Material | Weight-loss temperature: Initiation (°C.) | Weight-loss temperature: 5 wt % (°C.) | Coefficient of thermal expansion $\alpha \times 10^5$ °K. | Solubility in ketone solvent |
|---|---|---|---|---|
| Cyanato-terminated Schiff's compound (A') | 390 | 530 | 0.8 | ○ |
| Cyanato-terminated Schiff's compound (B') | 372 | 525 | 0.9 | ○ |
| BMI | 369 | 473 | 1.5 | X |
| MC-600 | 358 | 506 | 1.4 | X |

EXAMPLE 27

A cyanato-terminated Schiff's compound:

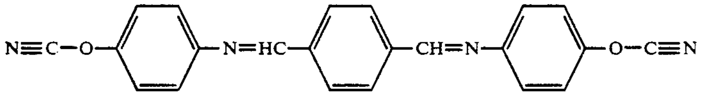

was dissolved in a 50:50 (by weight) NMP-MEK mixture to prepare 100 ml of a varnish of 8 wt % concentration. Then, a glass fabric (WF-230, mfd. by Nitto-bo Co., Ltd.) was immersed in the varnish, and the impregnated fabric was dried by heating at 100°-120° C. for about 3 hours. The resin content of the obtained prepreg was 4 wt %.

Then, 6 sheets of the prepreg were superposed together and compression-molded under the conditions of 160° C.$\times$50 Kg·f/cm$^2\times$2 hours. The molding showed a tensile strength of 16.5 Kg/cm$^2$ at 100° C. (ASTM D-638), flexural strength of 15.5 Kg/cm$^2$ at 100° C. (ASTM D-790), and Izod impact strength (notched) of 6.6 Kg·cm/cm at 25° C. (ASTM D-256).

EXAMPLE 28

A cyanato-terminated Schiff's compound:

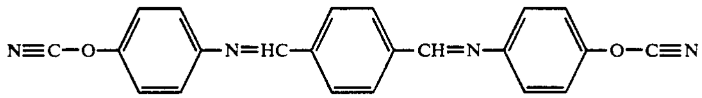

was dissolved in dimethylformamide to prepare a solution of 2 wt % concentration. Then, this solution was applied by using a spinner coater at 3500 rpm on a thoroughly-washed transparent conductive film supported by a polyethylene terephthalate film, and was dried at 120° C. for 15 minutes to evaporate the dimethylformamide and form a 650-Å thick film, which was rubbed with felt in a definite direction, thus preparing a substrate film having a molecular orientation controlling film.

Two films prepared in this way were arranged with the orientation controlling films facing each other, and was bonded together by using a polyester-based sealant, forming a liquid crystal display device. A liquid crystal of the phenylcyclohexane family (ZLI-1132, mfd. by Merck Co.) was filled in the space between the orientation controlling films, and the orientation state of the liquid crystal was examined by inserting the device between two crossed polarizing plates, where the liquid crystal showed a good orientation state.

EXAMPLE 29

Figure 3:
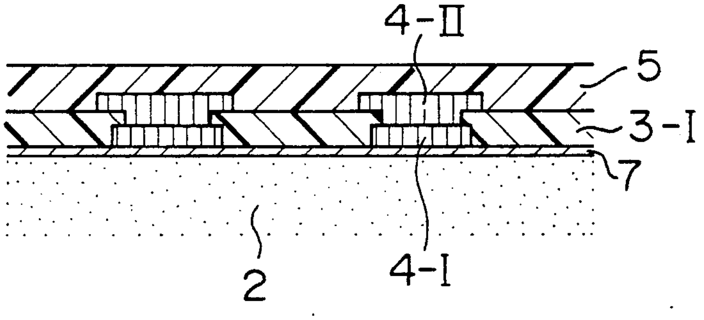

Compound (A') prepared in Example 25 was dissolved in toluene to prepare a solution of 1 wt % concentration. FIGS. 2 and 3 show each the structure of a semiconductor device provided with double-layer circuit insulating films formed by using this solution.

The device was constructed as follows: An Si substrate was overlaid in turn with an insulating $SiO_2$ layer and with a poly silicon layer, and a first aluminum wiring (4-I) was formed thereon. A portion of the above solution was applied (using a spinner coater) on the wiring, and dried and baked (250° C. for 60 minutes) to form a first insulating film (3-I). Then, a positive resist composition, and the aluminum foil was patterned. Thereafter, plasma etching was conducted by using $CF_4$-$O_2$ as reactant gas and further using $O_2$ as reactant gas, thereby removing the positive resist.

In the next place, a second aluminum wiring (4-II) was formed, and a portion of the above solution was further applied, and baked (under the same conditions as mentioned above) to form a second insulating film (3-II).

FIG. 2 shows the structure of a semiconductor device (5 layers) wherein the second insulating film was formed from a polyimide resin (PIQ, mfd. by Hitachi Kasei Co., Ltd.).

The semiconductor device thus prepared according to the present invention was packaged by using an epoxy resin molding compound with a phenol novolac hardener, thereby preparing an LSI for memory use (1M bit D-RAM memory). After this LSI had been allowed to stand in an atmosphere of 85° C. and 85% R. H. for 3000 hours while applying a bias, no wire break failure due to Al wire corrosion occurred therein. Thus, the LSI was found to be excellent in moisture resistance. The soft error ratio of this LSI is 50 Fit $10^{-9}$/number of LSI×hours and it is superior in α-ray resistance.

An epoxy resin blend having the following composition was milled for 10 minutes on a pair of rolls heated at 70°-80° C., and was coarsely ground to prepare a sealing resin composition.

Sealing epoxy resin composition:

| Sealing epoxy resin composition: | |
|---|---|
| Novolac type epoxy resin | 100 parts |
| Phenol-Formaldehyde resin | 55 parts |
| Catalyst of imidazole family | 3 parts |
| Fused quartz powder | 480 parts |
| Epoxy silane | 2 parts |
| Hoechst wax | 2 parts |
| Carbon black | 1 part |

Semiconductor components having said protective coatings can be sealed by using cans, solder-fused ceramics, or glass-fused ceramics, besides by using resins.

The polymer produced from the Schiff's compound of the present invention is characterized by being superior in solubilities in general-purpose solvents to conventional addition polymers and providing hardened products which are equal or superior in heat resistance to those of the conventionals and exhibit smaller coefficients of thermal expansion.

What is claimed is:

1. A polymer constructed mainly of dihydropyridine or dihydrotriazine rings, produced from a cyclization of a compound represented by the general formula $$X-(Z-Y-\alpha)_n$$

where n=1 or 2, α is selected from the group consisting of N≡C—NH—, N≡CO—, HC≡C—; wherein Z is —N=CH= or —CH=N—; wherein X and Y may be the same or different, and each is a member selected from the group consisting of linear and branched $C_1$-$C_{12}$ alkylene radicals, substituted and unsubstituted $C_1$-$C_{24}$ arylene radicals, and radicals of 4 to 8 member heterocyclic ring structures containing one or more nitrogen or oxygen atoms; wherein when n=2 the Y moeties may be the same or different said polymer being electrically non-conductive.

2. The polymer according to claim 1 constituted mainly of (i) dihydropyridine rings which are represented by the general formula

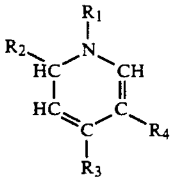

wherein; $R_1$ is —$CH_2$— or

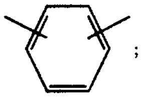 ;

$R_2$ is —H, —$CH_3$,

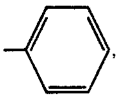, 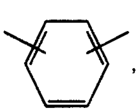, 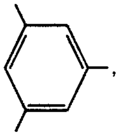,

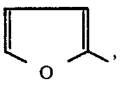, 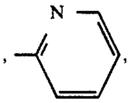, or 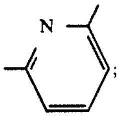;

and each of $R_3$ and $R_4$ is —$CH_2$— or

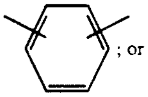 ; or (ii) 1,2-dihydro-1,3,5-triazine rings which are represented by the general formula

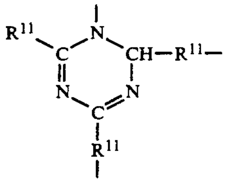

wherein $R^{11}$s are the same or different aromatic residues such as phenylene.

3. The polymer according to claim 1, wherein the polymer is obtained by heating at a temperature of from about 120° C. to about 200° C., a compound represented by the general formula:

$$HC{\equiv}C-Y_1-CH{=}N-X-N{=}CH-Y_2-C{\equiv}CH \quad [I]$$

wherein; X is —$CH_2)_m$,

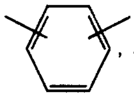, 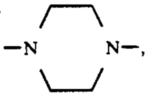,

-continued

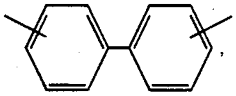, substituted-phenylene, 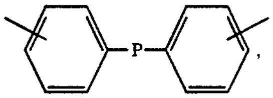,

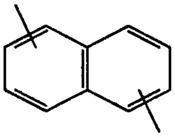, 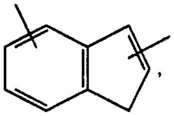,

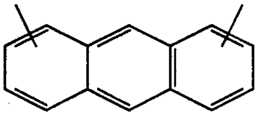,

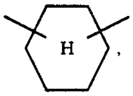, 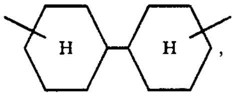,

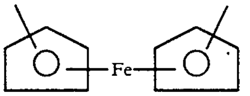 or

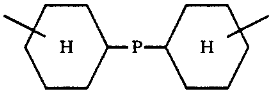

wherein, m is an integer of 1 to 12 and P is

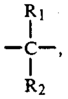,

—O—, —CO—, —S—, —$SO_2$, or

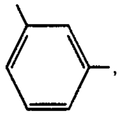, wherein $R_1$ and $R_2$ are the same or different and denote each —H, —$CH_3$, —$C_2H_5$, —$CF_3$,

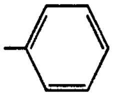 or 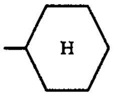;

and $Y_1$ and $Y_2$ are the same or different divalent organic residues, at 120° C. to 200° C.

4. The polymer according to claim 1 having a cross ladder-like molecular skeleton constructed mainly of dihydropyridine rings, which is produced from a Schiff's compound(s) having an ethynyl group at one end of the molecule, said compound(s) being represented the general formula $$X_3—CH{=}N—Y_3—C{\equiv}CH \quad [III]$$

and/or by the general formula $$X_3—N{=}CH—Y_3—C{\equiv}CH \quad [IV]$$

wherein; $X_3$ is —H, $C_1$-$C_{18}$ alkyl,

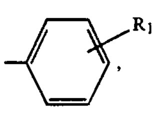, 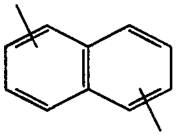, or

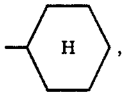, wherein $R_1$ is —H, —F, —Cl, —Br, —$CH_3$, $CF_3$, —OH, —$NH_2$,

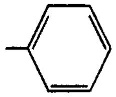, or 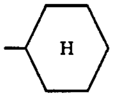;

and $Y_3$ is —$CH_2)_m$,

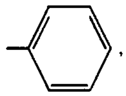, 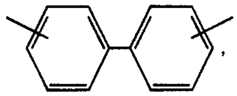,

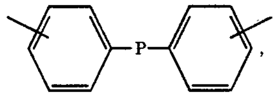,

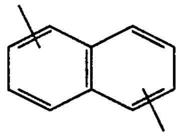, ,

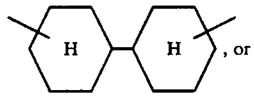, or

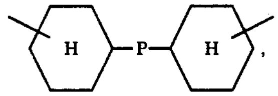, wherein, m is an integer of 1 to 12 and P is —$CH_2)_m$, —O—, —CO—, —S—, —SO—, —$SO_2$—,

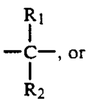, or 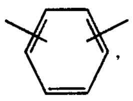, wherein, $R_1$ and $R_2$ are the same or different and denote each —H, —$CH_3$, —$C_2H_5$, —$CF_3$,

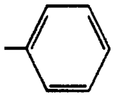, or 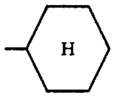;

by heating and reacting the compound at temperatures between 120° C. and 180° C. said polymer being electrically non-conductive.

5. The polymer according to claim 1 from a Schiff's compound having a cyanato group at each end of the molecule and plural Schiff's bonds in the molecule, said compound being represented by the general formula

N≡C—O—$Y_1$—N=HC—$X_1$—CH=N—$Y_2$—O—C≡N [V]

wherein, $X_1$ is —$CH_2)_m$,

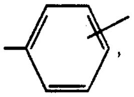, 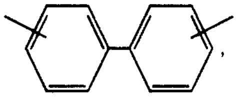, substituted phenylene,

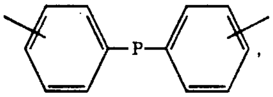,

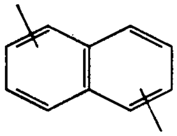, or 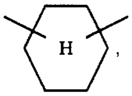, wherein, m is an integer of 1 to 12 and P is

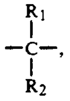

—O—, —CO—, —S—, or —$SO_2$—, wherein, $R_1$ and $R_2$ are the same or different and denote each —H, —$CH_3$, —$C_2H_5$, —$CF_3$,

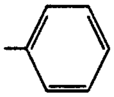, or 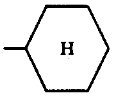;

and $Y_1$ and $Y_2$ are the same or different divalent organic residues said polymer being electrically non-conductive.

6. The polymer of claim 5, which is produced by polymerizing said Schiff's compound under heating at temperatures between 120° C. and 180° C.

7. The polymer of claim 5, which comprises dihydrotriazine rings.

8. The polymer according to claim 1 from a Schiff's compound having a cyanato group at each end of the molecule and plural Schiff's bonds in the molecule, said compound being represented by the general formula

N≡C—O—$Y_1$—CH=N—$X_2$—N=CH—$Y_2$—O—C≡N [VI]

wherein; $X_2$ is —$CH_2)_m$,

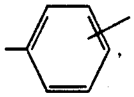, 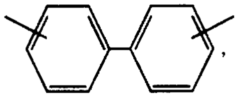,

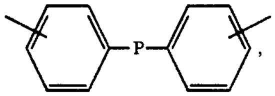,

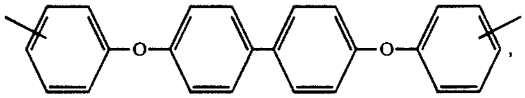,

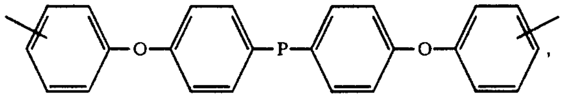,

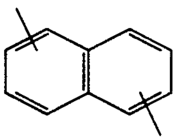, or , wherein, m is an integer of 1 to 12 and P is

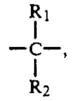

—O—, —CO—, —S—, or —$SO_2$—, wherein $R_1$ and $R_2$ are the same or different and denote each —H, —$CH_3$, —$C_2H_5$, —$CF_3$,

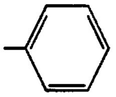, or 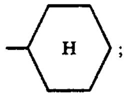;

and $Y_1$ and $Y_2$ are the same or different divalent organic residues said polymer being electrically non-conductive.

9. The polymer of claim 8, which is produced by polymerizing said Schiff's compound under heating at temperatures between 120° C. and 180° C.

10. The polymer of claim 8, which comprises dihydrotriazine rings.

11. The polymer according to claim 1 having a cross ladder-like molecular skeleton constructed mainly of dihydropyridine rings, which is produced from a compound having an ethynyl group at each end of the molecule and at least two Schiff's bonds in the molecule, said compound being represented by the general formula

HC≡C—$Y_1$—N=HC—$X_1$—CH=N—$Y_2$—C≡CH [I]

wherein; $X_1$ is $-(-CH_2-)-_m$ (m denotes an integer of 1 to 12),

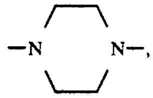 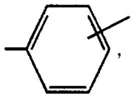,

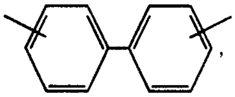, substituted-phenylene,

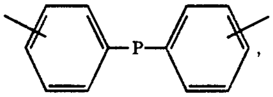,

[P denotes

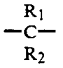

($R_1$ and $R_2$ are the same or different and represent each —H, $-CH_3$, $-C_2H_5$, $-CF_3$,

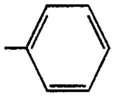, or 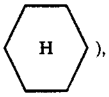), —O—, —CO—,

—S—, $-SO_2-$ or 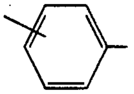],

-continued

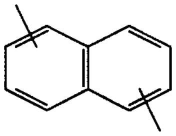, 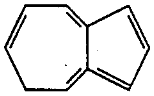,

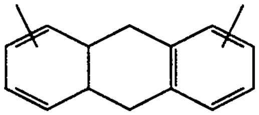,

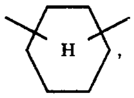, 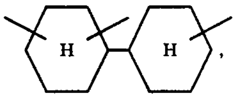,

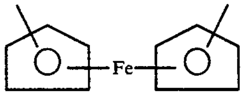, or

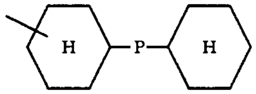

(P is as defined above); and $Y_1$ and $Y_2$ are the same or different divalent organic residues; by heating and reacting the compound at temperatures between 120° C. and 180° C.

12. The polymer of claim 1, wherein said compound is

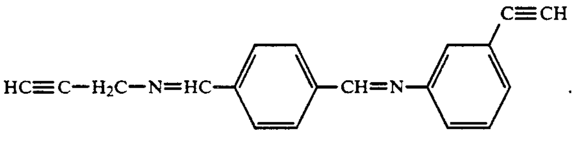.

* * * * *